US012051351B2

(12) United States Patent
Seo et al.

(10) Patent No.: US 12,051,351 B2
(45) **Date of Patent: *Jul. 30, 2024**

(54) DISPLAY DEVICE

(71) Applicant: Samsung Display Co., Ltd., Yongin-si (KR)

(72) Inventors: Hae-Kwan Seo, Hwaseong-si (KR); Taehoon Kim, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/224,883

(22) Filed: Jul. 21, 2023

(65) Prior Publication Data

US 2023/0368712 A1 Nov. 16, 2023

Related U.S. Application Data

(63) Continuation of application No. 17/947,490, filed on Sep. 19, 2022, now Pat. No. 11,749,152, which is a (Continued)

(30) Foreign Application Priority Data

Jun. 29, 2020 (KR) ........................ 10-2020-0079610

(51) Int. Cl.

*G09G 3/00* (2006.01)
*G09G 3/3266* (2016.01)
*G09G 3/3275* (2016.01)

(52) U.S. Cl.

CPC ........... *G09G 3/035* (2020.08); *G09G 3/3266* (2013.01); *G09G 3/3275* (2013.01); *G09G 2310/08* (2013.01)

(58) Field of Classification Search

CPC .... G06F 1/1652; G06F 1/1641; G06F 1/1616; G09F 9/301; H01L 2251/5338; (Continued)

(56) References Cited

U.S. PATENT DOCUMENTS 9,437,168 B2 * 9/2016 Her ...................... G09G 3/3225
9,613,554 B2 4/2017 Jang et al.
(Continued)

FOREIGN PATENT DOCUMENTS

CN 109584806 A 4/2019
CN 111681550 A 9/2020
(Continued)

*Primary Examiner* — Koosha Sharifi-Tafreshi
(74) *Attorney, Agent, or Firm* — CANTOR COLBURN LLP

(57) ABSTRACT

A display device includes a display panel, a data driving circuit, a scan driving circuit, and a driving controller. The driving controller receives an image signal and a control signal and controls the data and scan driving circuits to display an image on the display panel. The driving controller divides the display panel into first and second display regions based on the image signal, and outputs start and masking signals indicating starts of one frame and the second display region, respectively. First and second frames have first and second durations, respectively. The scan driving circuit sequentially drives scan lines in synchronization with the start signal and stop the driving of scan lines, corresponding to the second display region, of the scan lines, in response to the masking signal.

16 Claims, 18 Drawing Sheets

Related U.S. Application Data continuation of application No. 17/206,613, filed on Mar. 19, 2021, now Pat. No. 11,450,251.

(58) Field of Classification Search

CPC .. G09G 2380/02; G09G 3/035; G09G 3/3266; G09G 3/3275; G09G 2310/08; G09G 3/3233; G09G 2300/0819; G09G 2300/0842; G09G 2300/0861; G09G 2310/0251; G09G 2310/0262; G09G 2310/0286; G09G 2310/04; G09G 2320/0238; G09G 2330/021; G09G 2340/0435; G09G 3/3225

See application file for complete search history.

(56) References Cited

U.S. PATENT DOCUMENTS

| | | | | |
|---|---|---|---|---|
| 2016/0042707 | A1 | 2/2016 | Wang et al. | |
| 2018/0075808 | A1 | 3/2018 | Yamashita et al. | |
| 2019/0206329 | A1 | 7/2019 | Lee et al. | |
| 2020/0152109 | A1* | 5/2020 | Jung | G09G 3/20 |
| 2020/0388228 | A1* | 12/2020 | Oh | G09G 5/373 |
| 2021/0027697 | A1 | 1/2021 | Yoon et al. | |

FOREIGN PATENT DOCUMENTS

| | | | |
|---|---|---|---|
| EP | 3770892 | A1 | 1/2021 |
| KR | 1020190083393 | A | 7/2019 |
| KR | 102072781 | B1 | 2/2020 |
| KR | 1020210013505 | A | 2/2021 |
| WO | 2020194492 | A1 | 10/2020 |

* cited by examiner

H: ... Hj-4, Hj-3, Hj-2, Hj-1, Hj, Hj+1 ...

DISPLAY DEVICE

This application is a continuation of U.S. patent application Ser. No. 17/947,490, filed on Sep. 19, 2022, which is a continuation of U.S. patent application Ser. No. 17/206,613, filed on Mar. 19, 2021, which claims priority to Korean Patent Application No. 10-2020-0079610, filed on Jun. 29, 2020, and all the benefits accruing therefrom under 35 U.S.C. § 119, the content of which in its entirety is herein incorporated by reference.

BACKGROUND

The present disclosure relates to a display device, and in particular, to a display device with a high operation speed.

An organic light emitting display device, as one of display devices, displays an image using an organic light emitting diode, in which light is generated by recombination of electrons and holes. Such an organic light emitting display device has technical advantages, such as fast response speed and low power consumption.

The organic light emitting display device includes pixels that are connected to data and scan lines. In general, each of the pixels includes an organic light emitting diode and a circuit portion, which controls an amount of a current flowing through the organic light emitting diode. In the circuit portion, the amount of the current flowing through the organic light emitting diode is controlled by a data signal. In this case, luminance of light generated by organic light emitting diode is determined by the amount of the current.

When a video image is displayed on the display device, the higher the driving frequency, the better the display quality of the video image. However, a fabrication cost should be increased to fabricate a display device operated with a high driving frequency.

SUMMARY

An embodiment of the inventive concept provides a display device, a region of which is driven with a frequency higher than a normal frequency.

According to an embodiment of the inventive concept, a display device includes: a display panel including a plurality of pixels, which are connected to a plurality of data lines and a plurality of scan lines; a data driving circuit which drives the plurality of data lines; a scan driving circuit which drives the plurality of scan lines; and a driving controller which receives an image signal and a control signal and controls the data driving circuit and the scan driving circuit to display an image on the display panel. The driving controller divides the display panel into a first display region and a second display region based on the image signal, and outputs a start signal indicating a start of one frame and a masking signal indicating a start of the second display region. A first frame has a first duration, and a second frame following the first frame has a second duration. The scan driving circuit sequentially drives the plurality of scan lines in synchronization with the start signal and stops the driving of scan lines, corresponding to the second display region, of the plurality of scan lines in response to the masking signal.

In an embodiment, the second duration of the second frame may be shorter than the first duration of the first frame, during a first mode.

In an embodiment, the first duration of the first frame may be equal to the second duration of the second frame, during a second mode different from the first mode.

In an embodiment, the first duration of the first frame during the first mode may be equal to the first duration of the first frame during the second mode.

In an embodiment, the first display region and the second display region may be driven with a predetermined frequency, during the second mode. During the first mode, the first display region may be driven with a first driving frequency higher than the predetermined frequency, and the second display region may be driven with a second driving frequency lower than the predetermined frequency.

In an embodiment, the driving controller may provide an image data signal, which corresponds to the first display region and the second display region, to the data driving circuit during the first frame of the first mode and may provide an image data signal, which corresponds to the first display region, not the second display region, to the data driving circuit during the second frame of the first mode.

In an embodiment, the driving controller may provide an image data signal, which corresponds to the first display region and the second display region, to the data driving circuit during every frame in a second mode different from the first mode.

In an embodiment, the scan driving circuit may include a plurality of driving stages, each of which drives a corresponding scan line of the plurality of scan lines. The each of the plurality of driving stages may include a driving circuit which outputs a scan signal to an output terminal, in response to clock signals and a carry signal from the driving controller, and a masking circuit which prohibits the driving circuit from outputting the scan signal, in response to the masking signal.

In an embodiment, a first driving stage of the plurality of driving stages may receive the start signal as the carry signal.

In an embodiment, the driving circuit may further output a first scan signal to a first output terminal and may output a second scan signal to a second output terminal, in response to the clock signals and the carry signal.

In an embodiment, the second scan signal, which is output from a j-th driving stage of the plurality of driving stages, may be provided as the carry signal for a (j+k)-th driving stage, where j and k are natural numbers.

In an embodiment, the masking signal may include a first masking signal and a second masking signal. The masking circuit may include: a first masking circuit which electrically connects a first voltage terminal and the first output terminal, in response to the first masking signal, and a second masking circuit which electrically connects the first output terminal and the second output terminal, in response to the second masking signal.

In an embodiment, during the first mode, the first masking circuit may electrically connect the first voltage terminal to the first output terminal, in response to the first masking signal of a first level. During the first mode, the second masking circuit may electrically disconnect the first output terminal from the second output terminal, in response to the second masking signal of a second level different from the first level.

According to an embodiment of the inventive concept, a display device includes a display panel including a plurality of pixels connected to a plurality of data lines and a plurality of scan lines; a data driving circuit which drives the plurality of data lines; a scan driving circuit which drives the plurality of scan lines; and a driving controller which receives an image signal and a control signal and controls the data driving circuit and the scan driving circuit to display an image on the display panel. A first non-folding region, a folding region, and a second non-folding region are defined in the display panel in a plan view. The driving controller divides the display panel into a first display region and a second display region, which correspond to the first non-folding region and the second non-folding region, respectively, and outputs a start signal indicating a start of one frame and a masking signal indicating a start of the second display region. A first frame has a first duration, and a second frame following the first frame has a second duration. The scan driving circuit sequentially drives the plurality of scan lines in synchronization with the start signal and stops the driving of scan lines, corresponding to the second display region, of the plurality of scan lines, in response to the masking signal.

In an embodiment, the second duration of the second frame may be shorter than the first duration of the first frame, during a first mode.

In an embodiment, the driving controller may provide an image data signal, which corresponds to the first display region and the second display region, to the data driving circuit during the first frame of the first mode and may provide an image data signal, which corresponds to the first display region, not the second display region, to the data driving circuit during the second frame of the first mode.

In an embodiment, the image data signal, which is provided to the first display region during the first mode, may be a moving image signal, and the image data signal, which is provided to the second display region during the first mode, may be a still image signal.

In an embodiment, the folding region of the display panel may be foldable along a folding axis extending in a predetermined direction.

According to an embodiment of the inventive concept, a display device includes a display panel including a plurality of pixels, which are connected to a plurality of data lines and a plurality of scan lines, a data driving circuit which drives the plurality of data lines, a scan driving circuit which drives the plurality of scan lines, and a driving controller which receives an image signal and a control signal and controls the data driving circuit and the scan driving circuit to display an image on the display panel. The driving controller divides the display panel into a first display region and a second display region, based on the image signal, provides an image data signal, which corresponds to the first display region and the second display region, to the data driving circuit during a first frame, and provides an image data signal, which corresponds to the first display region, not the second display region, to the data driving circuit during a second frame following the first frame.

In an embodiment, the driving controller may output a start signal indicating a start of one frame and a masking signal indicating a start of the second display region. The scan driving circuit may sequentially drive the plurality of scan lines in synchronization with the start signal and may stop the driving of scan lines, corresponding to the second display region, of the plurality of scan lines, in response to the masking signal.

In an embodiment, the scan driving circuit may include a plurality of driving stages, each of which drives a corresponding scan line of the plurality of scan lines. The each of the plurality of driving stages may include a driving circuit which outputs a scan signal to an output terminal, in response to clock signals and carry signal from the driving controller, and a masking circuit which prohibits the driving circuit from outputting the scan signal, in response to the masking signal.

In an embodiment, a first driving stage of the plurality of driving stages may receive the start signal as the carry signal.

In an embodiment, the driving circuit may output a first scan signal and a second scan signal to a first output terminal and a second output terminal, respectively, in response to the clock signals and the carry signal.

In an embodiment, the second scan signal, which is output from a j-th driving stage of the plurality of driving stages, may be provided as the carry signal for a (j+k)-th driving stage, where j and k are natural numbers.

In an embodiment, the masking signal may include a first masking signal and a second masking signal. The masking circuit may include: a first masking circuit which electrically connects a first voltage terminal and the first output terminal, in response to the first masking signal, and a second masking circuit which electrically connects the first output terminal and the second output terminal, in response to the second masking signal.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

Figure 1A:
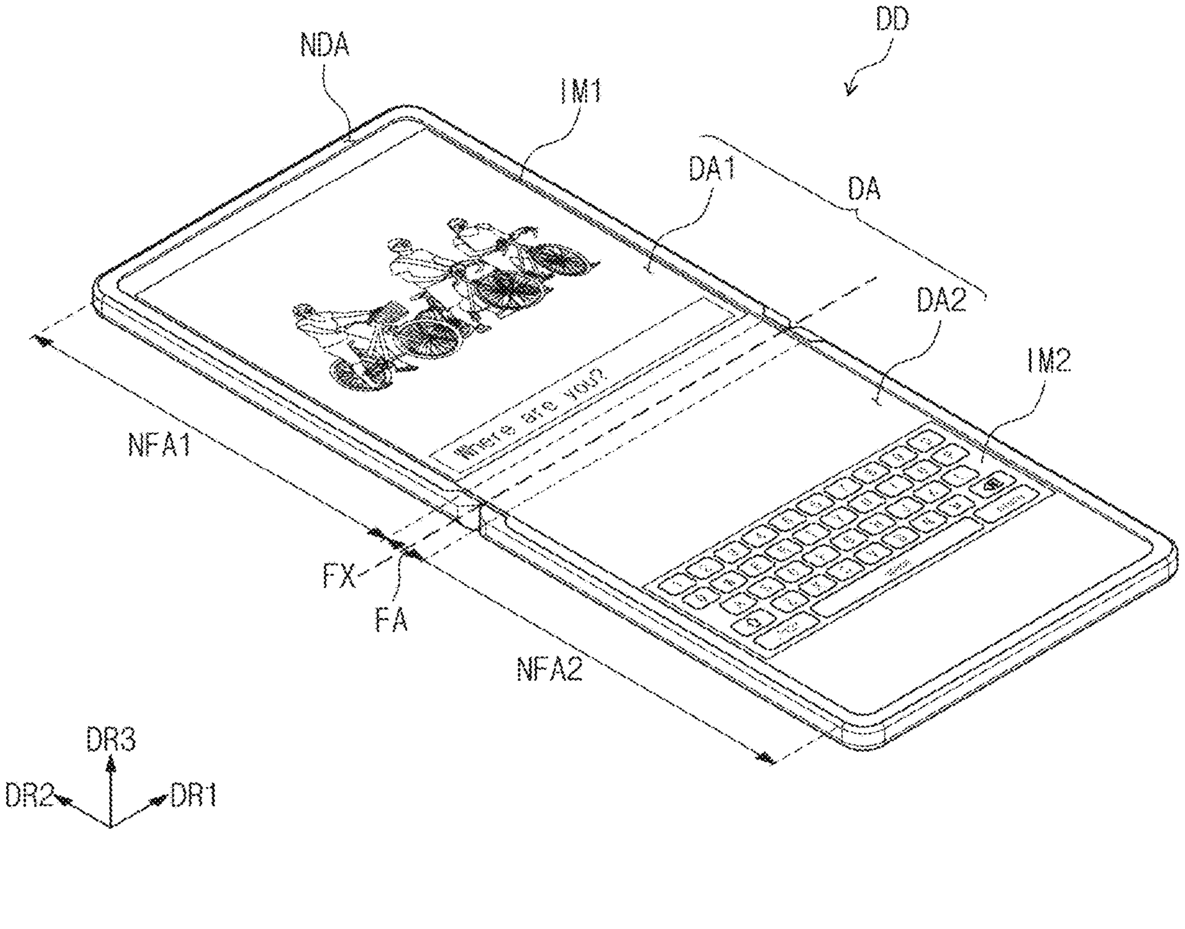
FIG. 1A is a perspective view illustrating a display device according to an embodiment of the inventive concept.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments of the inventive concepts will now be described more fully with reference to the accompanying drawings, in which example embodiments are shown. Example embodiments of the inventive concepts may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments of the inventive concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 1B:
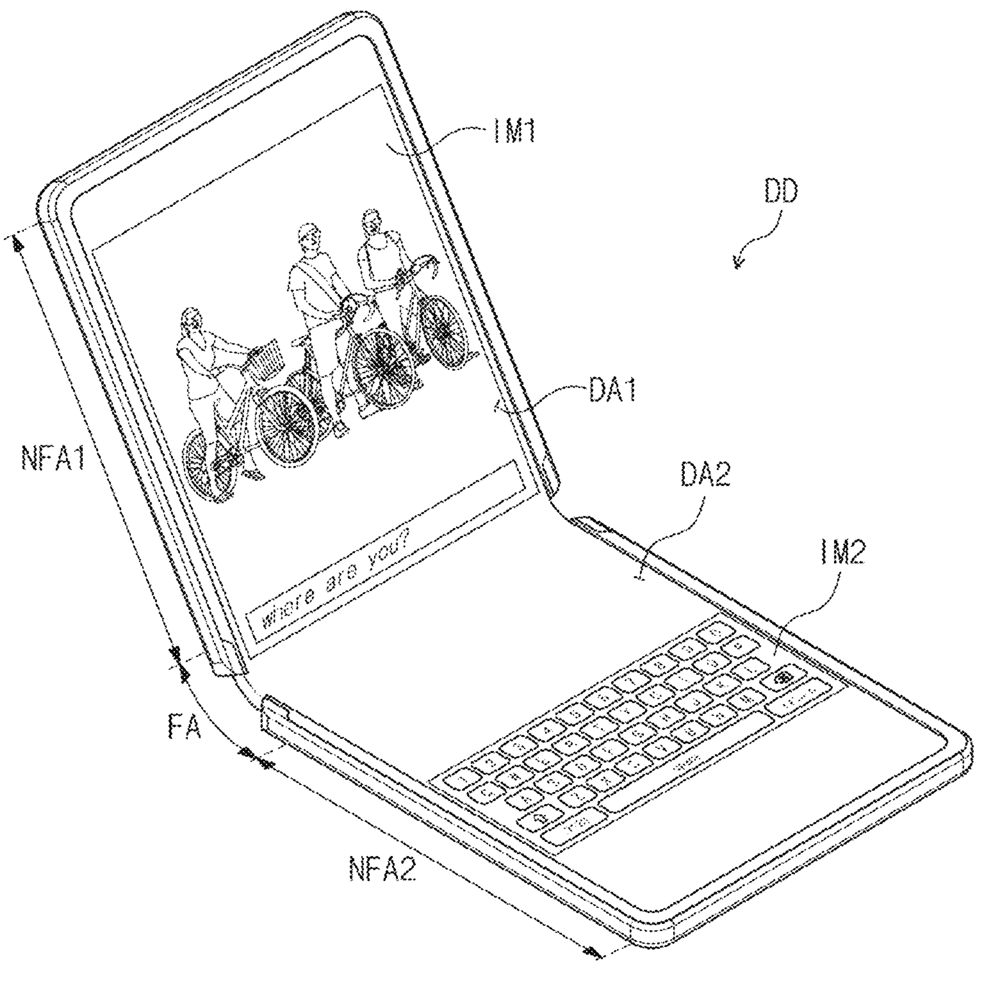
FIG. 1B is a perspective view illustrating a display device according to an embodiment of the inventive concept.

FIG. 1A is a perspective view illustrating a display device according to an embodiment of the inventive concept. FIG. 1B is a perspective view illustrating a display device according to an embodiment of the inventive concept. FIG. 1A illustrates a display device DD in an unfolded state, and FIG. 1B illustrates the display device DD in a folded state.

FIGS. 1A and 1B illustrate an example in which the display device DD is a cellular phone. However, the inventive concept is not limited to this example. The display device DD may include tablet personal computers ("PCs"), smart phones, Personal Digital Assistants ("PDAs"), Portable Multimedia Players ("PMP"), gaming machines, wristwatch-style electronic devices, or the like. The display device DD may be used for large-sized electronic devices (e.g., television sets or outdoor billboards) or small- or medium-sized electronic devices (e.g., personal computers, laptop computers, kiosk systems, car navigation systems, or cameras). However, it should be understood that these are merely example embodiments of the inventive concept, and that other electronic devices may be used to realize the inventive concept, unless they do not depart from the inventive concept.

The display device DD may include a display region DA and a non-display region NDA. The display device DD may display an image through the display region DA. When the display device DD is in an unfolded state, the display region DA may include a flat surface defined by a first direction DR1 and a second direction DR2. A thickness direction of the display device DD may be parallel to a third direction DR3 crossing both of the first and second directions DR1 and DR2. A front or top surface and a rear or bottom surface of each member constituting the display device DD may be defined, based on the third direction DR3. The non-display region NDA may be referred to as a bezel region. As an example, the display region DA may be rectangular or square. The non-display region NDA may enclose the display region DA.

The display region DA may include a first non-folding region NFA1, a folding region FA, and a second non-folding region NFA2. The folding region FA may be bendable along a folding axis FX extending in the first direction DR1.

If the display device DD is folded, the first non-folding region NFA1 and the second non-folding region NFA2 may face each other. Thus, when the display device DD is in a completely folded state, the display region DA may not be exposed to the outside, and this state may be referred to as an "in-folding" state. However, the operation of the display device DD is not limited to this example.

In an embodiment, for example, the display device DD may be folded in such a way that the first non-folding region NFA1 and the second non-folding region NFA2 may face opposite directions from each other. In such a folding state, the first non-folding region NFA1 may be exposed to the outside, and this state may be referred to as an "out-folding" state.

The display device DD may be operated in one of the in-folding and out-folding manners. Alternatively, the display device DD may be operated in both of the in-folding and out-folding manners. In this case, the specific region (e.g., the folding region FA) of the display device DD may be commonly folded during the in-folding and out-folding operations. In certain embodiments, the display device DD may include at least two different regions, one of which is folded in the in-folding manner, and another of which is folded in the out-folding manner.

FIGS. 1A and 1B illustrate an example, in which one folding region and two non-folding regions are provided, but the numbers of the folding and non-folding regions are not limited thereto. For example, the display device DD may include three or more non-folding regions and two or more folding regions, each of which is disposed between adjacent ones of the non-folding regions in another embodiment.

In FIGS. 1A and 1B, the folding axis FX is illustrated to be parallel to a short axis (i.e., latitudinal axis) of the display device DD, but the inventive concept is not limited to this example. For example, the folding axis FX may be parallel to a long axis (i.e., longitudinal axis) of the display device DD (e.g., the second direction DR2). In this case, the first non-folding region NFA1, the folding region FA, and the second non-folding region NFA2 may be sequentially arranged in the first direction DR1.

A plurality of display regions DA1 and DA2 may be defined in the display device DD. FIG. 1A illustrates an example with two display regions DA1 and DA2, but the number of the display regions DA1 and DA2 according to the invention are not limited thereto.

The display regions DA1 and DA2 may include a first display region DA1 and a second display region DA2. For example, the first display region DA1 may be a region, on which a first image IM1 is displayed, the second display region DA2 may be a region, on which a second image IM2 is displayed, but the inventive concept is not limited thereto. For example, the first image IM1 may be a video image (i.e., a moving image), and the second image IM2 may be a still image or a text image which does not change for a relatively long period compared to the moving image.

When the display device DD is in the normal frequency mode, both of the first and second display regions DA1 and DA2 may be driven with a predetermined normal frequency (e.g., 60 Hertz (Hz)). When the display device DD is in a multi-frequency mode, the first display region DA1 displaying the first image IM1 may be driven with a first driving frequency that is higher than the normal frequency, and the second display region DA2 displaying the second image IM2 may be driven with a second driving frequency that is lower than the normal frequency. Due to the increase of the driving frequency of the first display region DA1, it may be possible to improve a display quality of a video image (i.e., a moving image) displayed on the display device DD. Due to the reduction of the driving frequency of the second display region DA2, it may be possible to reduce power consumption of the display device DD.

A size of each of the first and second display regions DA1 and DA2 may be predetermined but may be changed by an application program or by a type of an image displayed on the first and second display regions DA1 and DA2. In an embodiment, the first display region DA1 may correspond to the first non-folding region NFA1, and the second display region DA2 may correspond to the second non-folding region NFA2. In an embodiment, a portion of the folding region FA may correspond to the first display region DA1, and another portion of the folding region FA may correspond to the second display region DA2.

In an embodiment, the first display region DA1 may correspond to a portion of the first non-folding region NFA1, and the second display region DA2 may correspond to another portion of the first non-folding region NFA1, the folding region FA, and the second non-folding region NFA2. In other words, an area of the first display region DA1 may be smaller than an area of the second display region DA2.

In another embodiment, the first display region DA1 may correspond to the first non-folding region NFA1, the folding region FA, and a portion of the second non-folding region NFA2, and the second display region DA2 may correspond to another portion of the second non-folding region NFA2. In other words, the area of the second display region DA2 may be smaller than the area of the first display region DA1.

As shown in FIG. 1B, when the folding region FA is a folded state, the first display region DA1 may correspond to the first non-folding region NFA1, and the second display region DA2 may correspond to the folding region FA and the second non-folding region NFA2.

FIGS. 1A and 1B illustrate an example, in which a foldable display device is used as the display device DD, but the inventive concept is not limited to this example. For example, the inventive concept may be applied to an unfoldable display device, a display device with one or more folding regions, a rollable display device, or the like.

Figure 2:
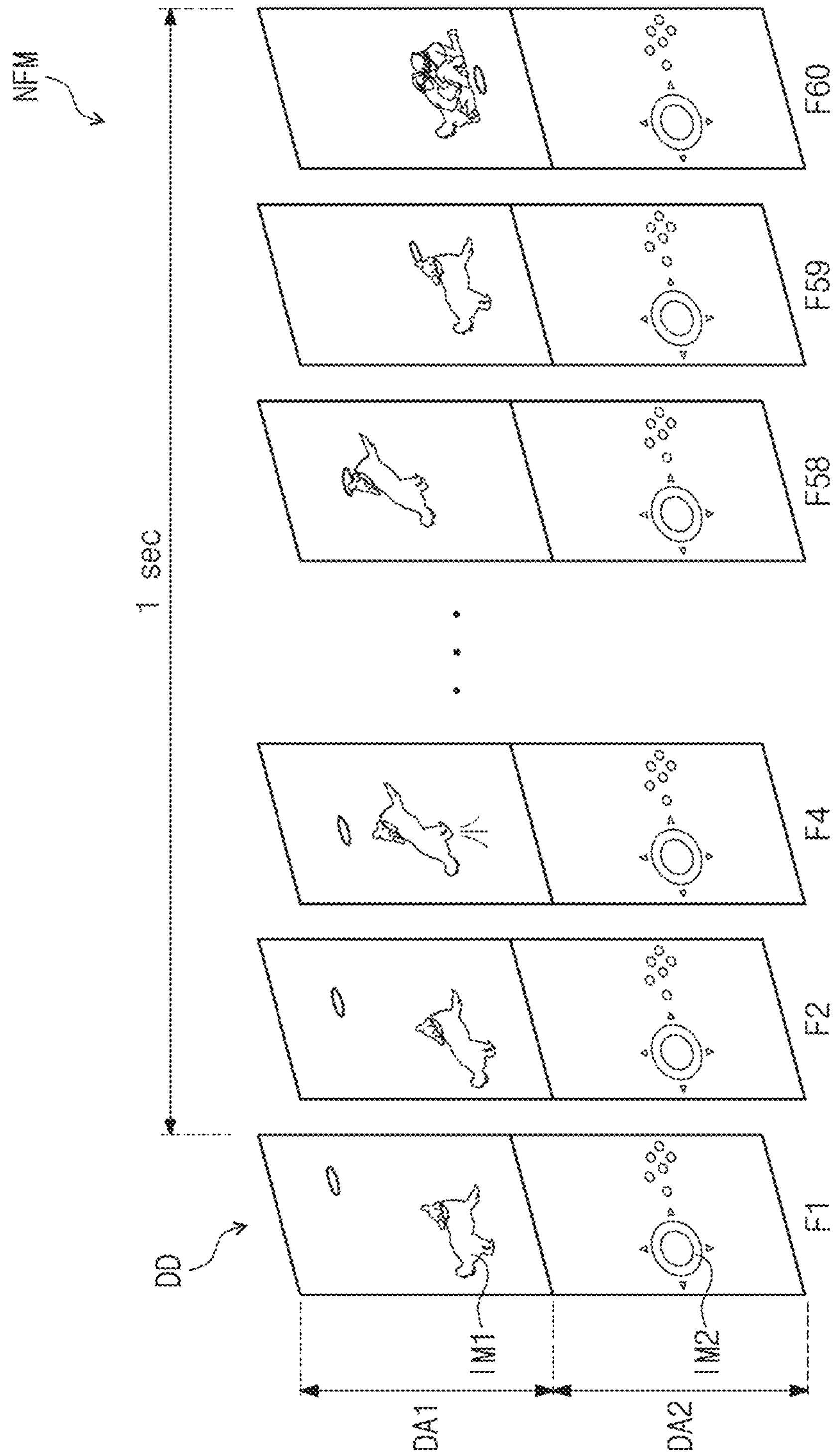
FIG. 2 is a diagram illustrating an operation of a display device in a normal frequency mode.
Figure 3:
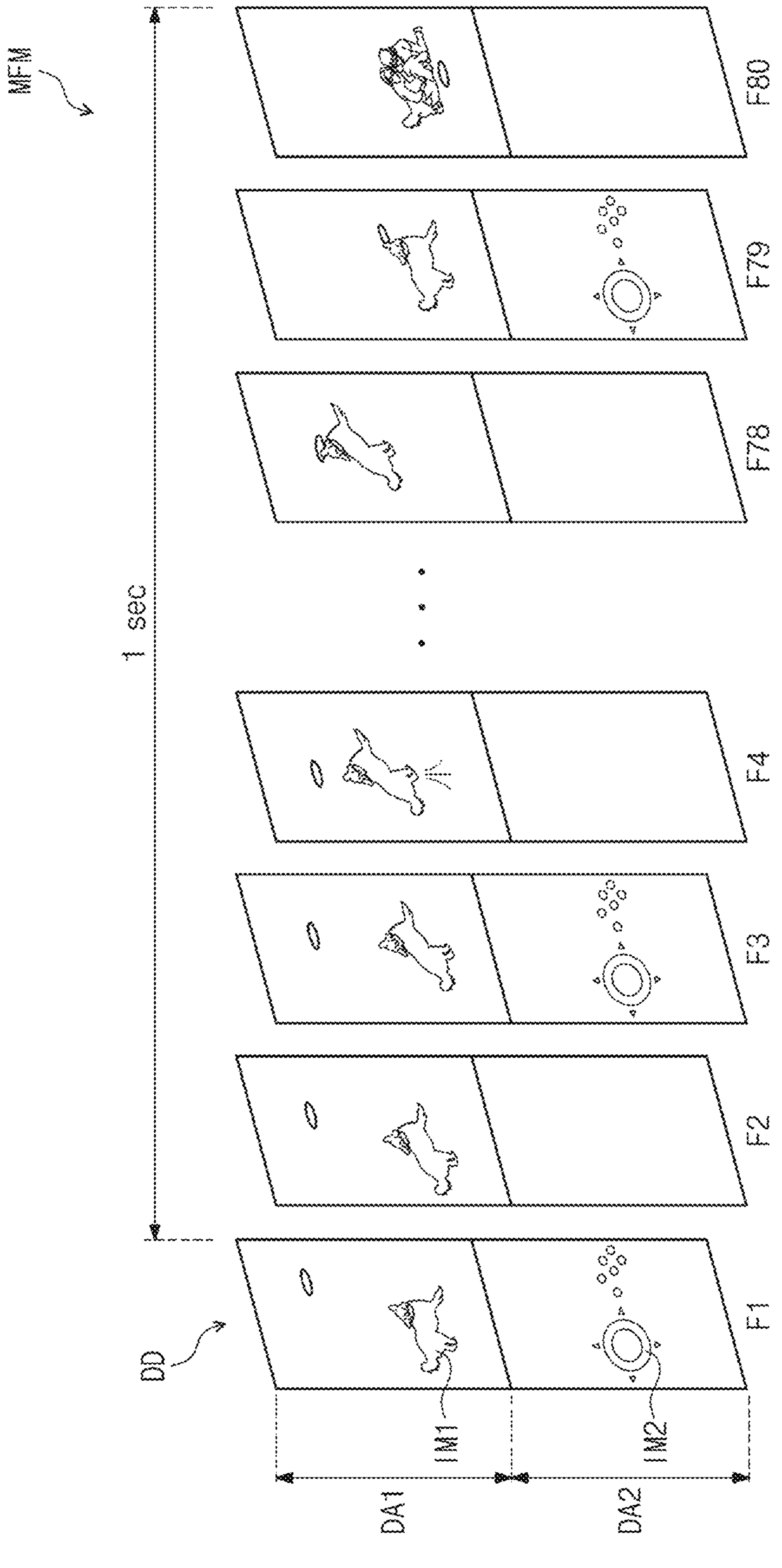
FIG. 3 is a diagram illustrating an operation of a display device in a multi-frequency mode.

FIG. 2 is a diagram illustrating an operation of a display device in a normal frequency mode. FIG. 3 is a diagram illustrating an operation of a display device in a multi-frequency mode.

Referring first to FIG. 2, in a normal frequency mode NFM, the driving frequency of the first and second display regions DA1 and DA2 of the display device DD may be a normal frequency. For example, the predetermined normal frequency may be 60 Hz. In the normal frequency mode NFM, an image may be displayed on the first and second display regions DA1 and DA2 of the display device DD at 1-st to 60-th frames F1 to F60, for 1 second (sec).

Referring to FIG. 3, in a multi-frequency mode MFM, the driving frequency of the first display region DA1 of the display device DD may be a first driving frequency higher than the normal frequency, and the driving frequency of the second display region DA2 may be a second driving frequency lower than the normal frequency. In the case where the normal frequency is 60 Hz, examples of the first and second driving frequencies may be given as in the following table 1.

TABLE 1

| First driving frequency | Second driving frequency |
|---|---|
| 80 Hz | 40 Hz |
| 90 Hz | 30 Hz |
| 102 Hz | 18 Hz |
| 110 Hz | 10 Hz |
| 118 Hz | 2 Hz |
| 119 Hz | 1 Hz |

In an embodiment, for example, in the multi-frequency mode MFM, in the case where the first driving frequency is 80 Hz and the second driving frequency 40 Hz (as shown in FIG. 3), the first image IM1 may be displayed on the first display region DA1 of the display device DD at the 1-st to 80-th frames F1 to F80 for 1 sec, and the second image IM2 may be displayed on the second display region DA2 at odd frames F1, F3, . . . , F79 of 80 frames. In other words, in the multi-frequency mode MFM, the first image IM1 of 80 frames per 1 sec may be displayed on the first display region DA1, and the second image IM2 of 40 frames per 1 sec may be displayed on the second display region DA2.

Since the first image IM1, which is the video image (i.e., a moving image), is displayed on the first display region DA1 with the first driving frequency of 80 Hz which is higher than the normal frequency of 60 Hz, the display quality in the first display region DA1 may be improved. Since the second image IM2, which is the still image, is displayed on the second display region DA2 with the second driving frequency of 40 Hz which is lower than the normal frequency of 60 Hz, the power consumption of the display device DD may be reduced.

Figure 4:
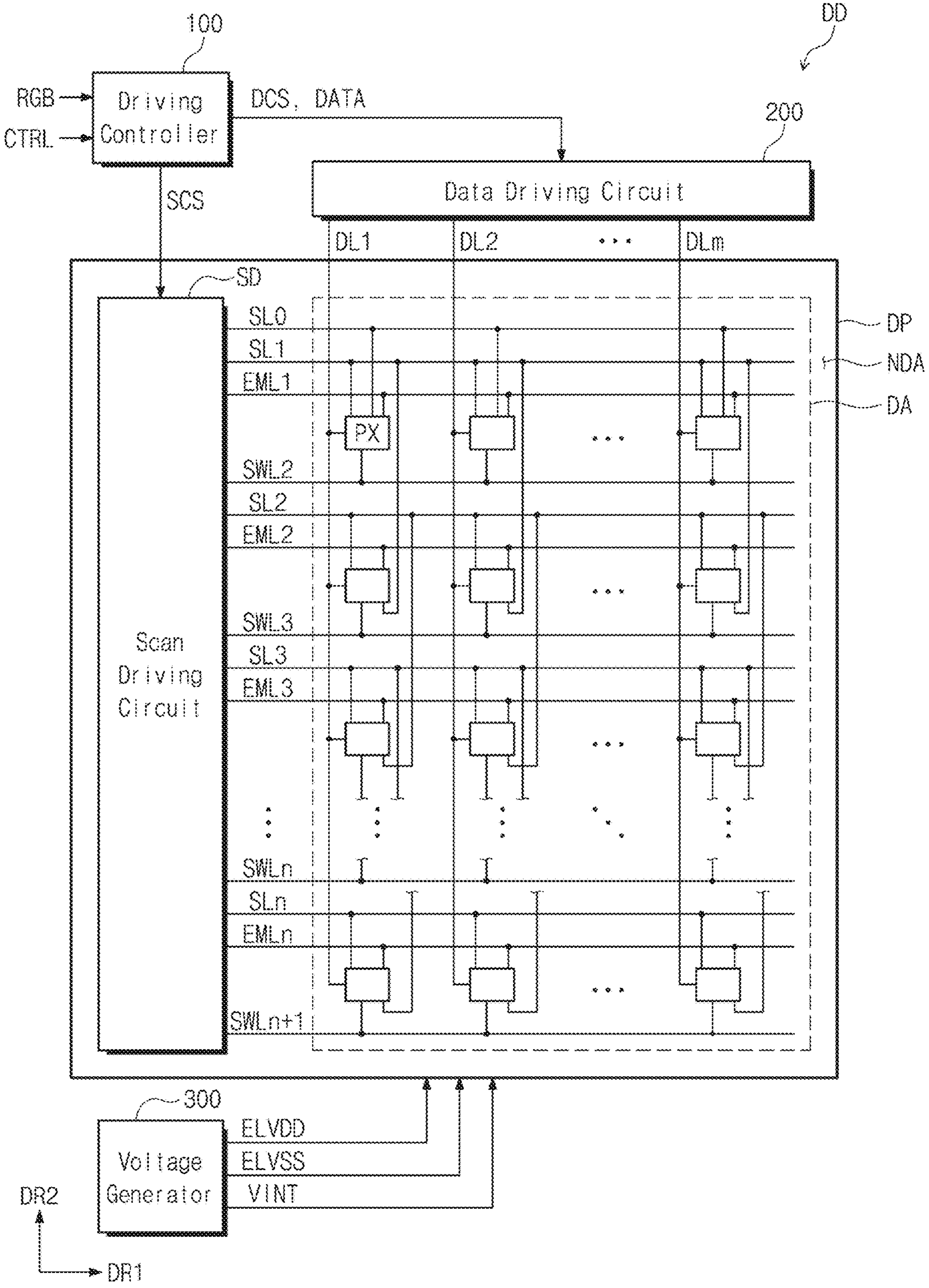
FIG. 4 is a block diagram illustrating a display device according to an embodiment of the inventive concept.

FIG. 4 is a block diagram illustrating a display device according to an embodiment of the inventive concept.

Referring to FIG. 4, the display device DD may include a display panel DP, a driving controller 100, a data driving circuit 200, and a voltage generator 300.

The driving controller 100 may receive an image signal RGB and a control signal CTRL. The driving controller 100 may convert a data format of the image signal RGB to produce an image data signal DATA, which is suitable for the interface specification with the data driving circuit 200. The driving controller 100 may output a scan control signal SCS and a data control signal DCS.

The data driving circuit 200 may receive the data control signal DCS and the image data signal DATA from the driving controller 100. The data driving circuit 200 may convert the image data signal DATA to data signals and then may output the data signals to a plurality of data lines DL1-DLm (which will be described below). The data signal may be an analog voltage corresponding to a gradation value of the image data signal DATA.

The voltage generator 300 may generate voltages for the operation of the display panel DP. In the present embodiment, the voltage generator 300 may generate a first driving voltage ELVDD, a second driving voltage ELVSS, and an initialization voltage VINT.

The display panel DP may include first scan lines SL0-SLn, second scan lines SWL2-SWLn+1, emission control lines EML1-EMLn, data lines DL1-DLm, and pixels PX. The display panel DP may further include a scan driving circuit SD. In an embodiment, the scan driving circuit SD may be placed near a first side of the display panel DP. The first scan lines SL0-SLn, the second scan lines SWL2-SWLn+1 and the emission control lines EML1-EMLn may be extended from the scan driving circuit SD in the first direction DR1.

The first scan lines SL0-SLn, the second scan lines SWL2-SWLn+1, and the emission control lines EML1-EMLn may be arranged to be spaced apart from each other in the second direction DR2. The data lines DL1-DLm may be extended from the data driving circuit 200 in an opposite direction (i.e., direction from upper part to lower part in FIG. 4) of the second direction DR2 and may be arranged to be spaced apart from each other in the first direction DR1.

The pixels PX may be electrically connected to the first scan lines SL0-SLn, the second scan lines SWL2-SWLn+1, the emission control lines EML1-EMLn, and the data lines DL1-DLm. Each of the pixels PX may be electrically connected to four scan lines. For example, a first row of pixels (i.e., pixels arranged in the first row in the display panel DP) may be connected to the scan lines SL0, SL1, SWL2, and EML1, as shown in FIG. 4. And, a second row of pixels may be connected to the scan lines SL1, SL2, SWL3, and EML2.

Each of the pixels PX may include an light emitting diode ED (e.g., see FIG. 5) and a pixel circuit portion PXC (e.g., see FIG. 5) controlling a light-emission operation of the light-emitting diode ED. The pixel circuit portion PXC may include a plurality of transistors and at least one capacitor. The scan driving circuit SD may include transistors, which are formed by the same forming process as the pixel circuit portion PXC.

Each of the pixels PX may receive the first driving voltage ELVDD, the second driving voltage ELVSS, and the initialization voltage VINT.

The scan driving circuit SD may receive the scan control signal SCS from the driving controller 100. The scan driving circuit SD may output first scan signals to the first scan lines SL0-SLn and output second scan signals to the second scan lines SWL2-SWLn+1, in response to the scan control signal SCS. A circuit structure and an operation of the scan driving circuit SD will be described in more detail below.

In the example shown in FIG. 4, the scan driving circuit SD may output emission control signals to the emission control lines EML1-EMLn. In certain embodiments, the display device DD may further include a separated light-emitting driving circuit generating the emission control signals. In this case, the scan driving circuit SD may output the first scan signals, which will be provided to the first scan lines SL0-SLn, and the second scan signals, which will be provided to the second scan lines SWL2-SWLn+1, and the light-emitting driving circuit may output the emission control signals, which will be provided to the emission control lines EML1-EMLn.

In an embodiment, the driving controller 100 may divide the display panel DP as the first display region DA1 (e.g., see FIG. 1) and the second display region DA2 (e.g., see FIG. 1), based on the image signal RGB, and may output at least one masking signal indicating the start of the second display region DA2. The at least one masking signal may be included in the scan control signal SCS.

Figure 5:
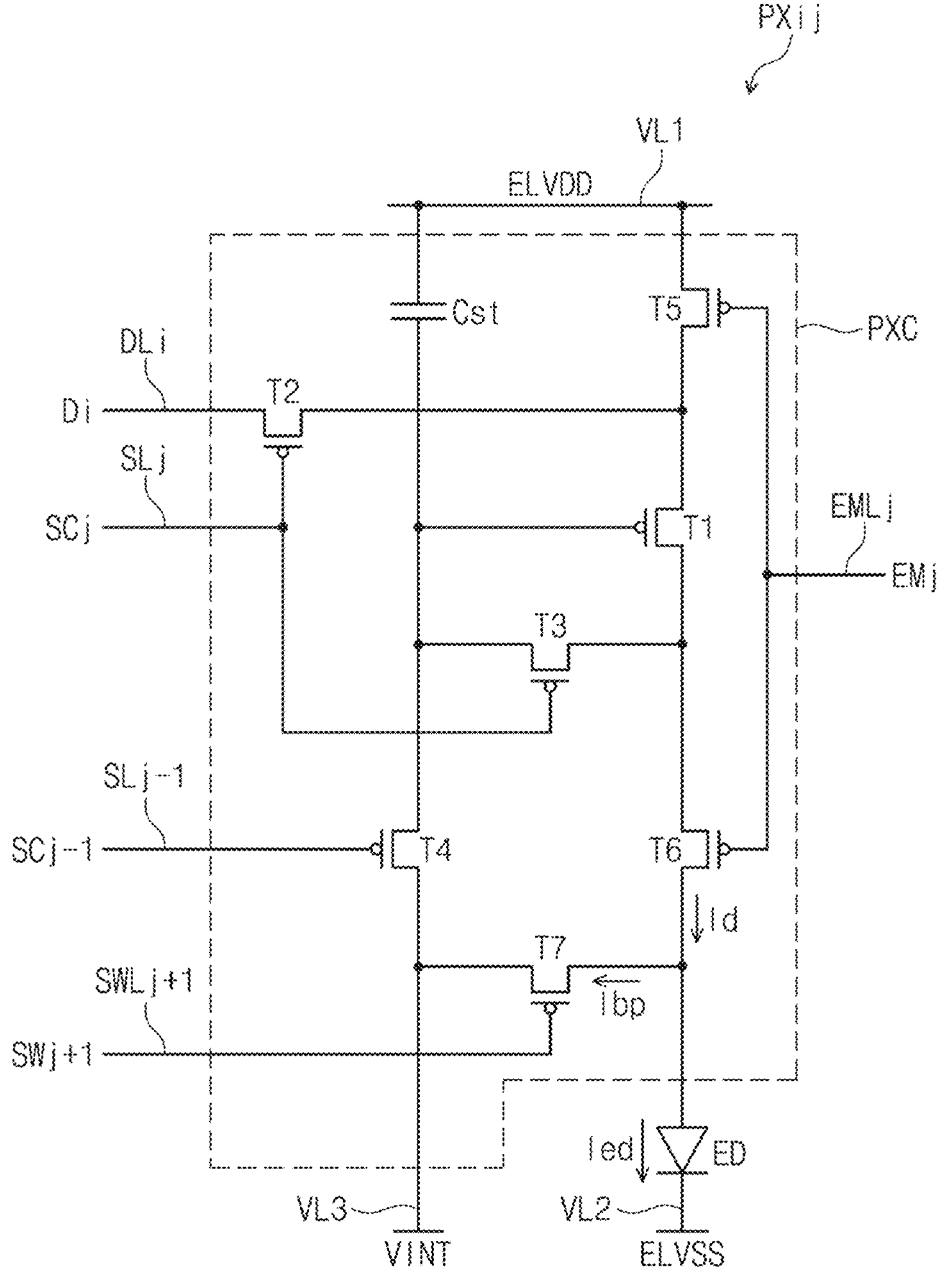
FIG. 5 is an equivalent circuit diagram illustrating a pixel according to an embodiment of the inventive concept.

FIG. 5 is an equivalent circuit diagram illustrating a pixel according to an embodiment of the inventive concept.

FIG. 5 exemplarily illustrates an equivalent circuit diagram of a pixel PXij, which is coupled to an i-th data line DLi of the data lines DL1-DLm of FIG. 4, (j−1)-th and j-th first scan lines SLj−1 and SLj of the first scan lines SL0-SLn, a (j+1)-th second scan line SWLj+1 of the second scan lines SWL2-SWLn+1, and a j-th emission control line EMLj of the emission control lines EML1-EMLn. Here, i is a natural number equal to or less than m, and j is a natural number equal to or less than n.

Each of the pixels PX shown in FIG. 4 may be configured to have the same circuit structure as that of the pixel PXij of FIG. 5. In the present embodiment, the pixel circuit portion PXC of the pixel PXij may include first to seventh transistors T1-T7 and one capacitor Cst. Each of the first to seventh transistors T1-T7 may be a p-type transistor having a low-temperature polycrystalline silicon ("LTPS") semiconductor layer. However, the inventive concept is not limited to this example, and at least one of the first to seventh transistors T1-T7 may be an n-type transistor having a semiconductor layer made of at least one of oxide semiconductor materials in another embodiment. In another embodiment, at least one of the first to seventh transistors T1-T7 may be an n-type transistor, and the others may be p-type transistors. Furthermore, the inventive concept is not limited to the circuit structure of the pixel PXij shown in FIG. 5. The pixel circuit portion PXC of FIG. 5 may be just one example, and the structure of the pixel circuit portion PXC may be variously modified.

Referring to FIG. 5, the pixel PXij of the display device DD may include first to seventh transistors T1, T2, T3, T4, T5, T6, and T7, a capacitor Cst, and at least one light-emitting diode ED. In the present embodiment, an example, in which one pixel PXij includes one light-emitting diode ED, will be described.

The (j−1)-th first scan line SLj−1, the j-th first scan line SLj, the (j+1)-th second scan line SWLj+1, and the j-th emission control line EMLj may be used to deliver an (j−1)-th first scan signal SCj−1, an j-th first scan signal SCj, an (j+1)-th second scan signal SWj+1, and an emission control signal EMj, respectively. The data line DLi may be used to deliver a data signal Di. The data signal Di may have a voltage level corresponding to corresponding portion of the image signal RGB to be input to the display device DD (e.g., see FIG. 4). First to third driving voltage lines VL1, VL2, and VL3 may be used to deliver the first driving voltage ELVDD, the second driving voltage ELVSS, and the initialization voltage VINT, respectively.

The first transistor T1 may include a first electrode connected to the first driving voltage line VL1 through the fifth transistor T5, a second electrode electrically connected to an anode of the light-emitting diode ED through the sixth transistor T6, and a gate electrode connected to an end of the capacitor Cst. If the i-th data signal Di is provided to the first transistor T1 through the i-th data line DLi by a switching operation of the second transistor T2, the first transistor T1 may supply a driving current Id to the light-emitting diode ED.

The second transistor T2 may include a first electrode connected to the i-th data line DLi, a second electrode connected to the first electrode of the first transistor T1, and a gate electrode connected to the j-th first scan line SLj. The second transistor T2 may be turned on by the j-th first scan signal SCj, which is transmitted through the j-th first scan line SLj, and in this case, the i-th data signal Di of the i-th data line DLi may be applied to the first electrode of the first transistor T1 through the second transistor T2.

The third transistor T3 may include a first electrode connected to the gate electrode of the first transistor T1, a second electrode connected to the second electrode of the first transistor T1, and a gate electrode connected to the j-th first scan line SLj. The third transistor T3 may be turned on by the j-th first scan signal SCj, which is transmitted by the j-th first scan line SLj, to connect the gate and second electrodes of the first transistor T1 to each other, and in this case, the first transistor T1 may behave like a diode.

The fourth transistor T4 may include a first electrode connected to the gate electrode of the first transistor T1, a second electrode connected to the third driving voltage line VL3 delivering the initialization voltage VINT, and a gate electrode connected to the (j−1)-th first scan line SLj−1. The fourth transistor T4 may be turned on by the (j−1)-th first scan signal SCj−1, which is transmitted through the (j−1)-th first scan line SLj−1, and in this case, the initialization voltage VINT may be applied to the gate electrode of the first transistor T1 through the fourth transistor T4. The initialization voltage VINT may be used for an initialization operation to initialize the voltage of the gate electrode of the first transistor T1.

The fifth transistor T5 may include a first electrode connected to the first driving voltage line VL1, a second electrode connected to the first electrode of the first transistor T1, and a gate electrode connected to the j-th emission control line EMLj.

The sixth transistor T6 may include a first electrode connected to the second electrode of the first transistor T1, a second electrode connected to the anode of the light-emitting diode ED, and a gate electrode connected to the j-th emission control line EMLj.

The fifth transistor T5 and the sixth transistor T6 may be simultaneously turned on by the j-th emission control signal EMj, which is transmitted through the j-th emission control line EMLj, and in this case, the first driving voltage ELVDD may be compensated through the first transistor T1 connected to a diode and then may be provided to the light-emitting diode ED.

The seventh transistor T7 may include a first electrode connected to the second electrode of the fourth transistor T4, a second electrode connected to the second electrode of the sixth transistor T6, and a gate electrode connected to the (j+1)-th second scan line SWLj+1.

As described above, one end of the capacitor Cst may be connected to the gate electrode of the first transistor T1, and the other end may be connected to the first driving voltage line VL1. A cathode of the light-emitting diode ED may be connected to the second driving voltage line VL2, which is used to deliver the second driving voltage ELVSS. The structure of the pixel PXij according to the inventive concept is not limited to the structure of FIG. 5, and the numbers of the transistor and capacitor constituting the pixel PXij and the connection structure therebetween may be variously modified.

Figure 6:
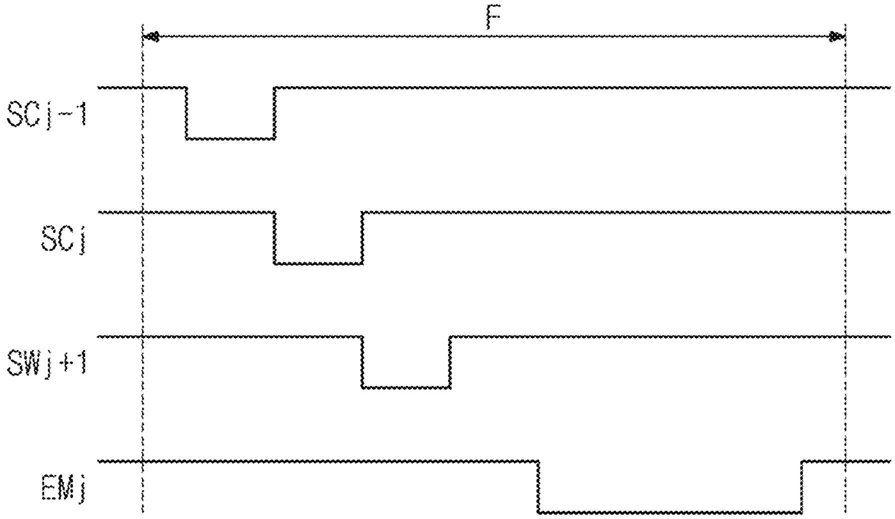
FIG. 6 is a timing diagram illustrating an operation of a pixel of a display device of FIG. 5.

FIG. 6 is a timing diagram illustrating an operation of a pixel of a display device of FIG. 5. The operation of the display device according to an embodiment of the inventive concept will be described with reference to FIGS. 5 and 6.

Referring to FIGS. 5 and 6, during the initializing period in a single frame F, the (j−1)-th first scan signal SCj−1 of a low level may be provided through the (j−1)-th first scan line SLj−1. The fourth transistor T4 may be turned on by the (j−1)-th first scan signal SCj−1 of the low level, and in this case, the initialization voltage VINT may be applied to the gate electrode of the first transistor T1 through the fourth transistor T4 to initialize the first transistor T1.

Next, the third transistor T3 may be turned on by the j-th first scan signal SCj of a low level, which is supplied through the j-th first scan line SLj during data programming and compensation periods. If the third transistor T3 is turned on, the first transistor T1 may function like a diode in a forward bias condition. In addition, the second transistor T2 may be turned on by the j-th first scan signal SCj of the low level. Then, the gate electrode of the first transistor T1 may be applied with a compensation voltage that is given by a difference between a voltage of the i-th data signal Di, which is supplied from the i-th data line DLi, and a threshold voltage of the first transistor T1. That is, the compensation voltage amounts to the voltage of the i-th data signal Di minus the threshold voltage of the first transistor T1. In other words, the gate voltage applied to the gate electrode of the first transistor T1 may become the compensation voltage.

The first driving voltage ELVDD and the compensation voltage may be applied to opposite ends of the capacitor Cst, and in this case, the capacitor Cst may store electric charges whose amount is determined by a voltage difference between its opposite ends.

If the (j+1)-th second scan signal SWj+1 of a low level is applied to the gate electrode of the seventh transistor T7 through the (j+1)-th second scan line SWLj+1, the seventh transistor T7 may be turned on. In this case, a part of the driving current Id serving as a bypass current Ibp may be discharged through the seventh transistor T7.

If the light-emitting diode ED emits light by the driving current Id corresponding to the minimum current of the first transistor T1, a black representation property of the pixel PXij may be deteriorated. However, according to an embodiment of the inventive concept, the seventh transistor T7 in the pixel PXij may allow a part of the minimum current of the first transistor T1 to constitute the bypass current Ibp, which is discharged through a current path (e.g., to the seventh transistor T7) that does not pass through the light-emitting diode ED. Here, the minimum current of the first transistor T1 refers to a current under a condition that the first transistor T1 is turned off since a gate-source voltage of the first transistor T1 is less than the threshold voltage of the first transistor T1. In the case where, under the turn-off condition of the first transistor T1, the minimum driving current (e.g., less than 10 picoamperes (pA)) is supplied to the light-emitting diode ED, the pixel PXij may display a black luminance image. The amount of the bypass current Ibp may greatly affect the minimum driving current, when the pixel PXij is used to display a black image, but it may be negligible, when the pixel PXij is used to display an image of typical color or white color. According to an embodiment of the inventive concept, due to the presence of the seventh transistor T7, a light-emission current Ted, which is supplied to the light-emitting diode ED, may be reduced to a level that is given by subtracting the bypass current Ibp from the driving current Id, when a driving current Id is supplied to the light-emitting diode ED to display a black image, and thus, the light-emission current Ted may have the minimum current amount capable of more effectively displaying the black image. That is, using the seventh transistor T7, it may be possible to more precisely realize the black luminance image and thereby to improve the contrast ratio of the pixel PXij. In the present embodiment, the bypass signal may be the (j+1)-th second scan signal SWj+1 of the low level, but the inventive concept is not limited to this example.

Next, during a light-emitting period, the j-th emission control signal EMj supplied from the j-th emission control line EMLj may be changed from a high level to a low level. During the light-emitting period, the fifth transistor T5 and the sixth transistor T6 may be turned on by the j-th emission control signal EMj of the low level. In this case, the driving current Id may be produced by a voltage difference between the gate voltage of the gate electrode of the first transistor T1 and the first driving voltage ELVDD, and the driving current Id may be supplied to the light-emitting diode ED through the sixth transistor T6 to pass through the light-emitting diode ED.

Figure 7:
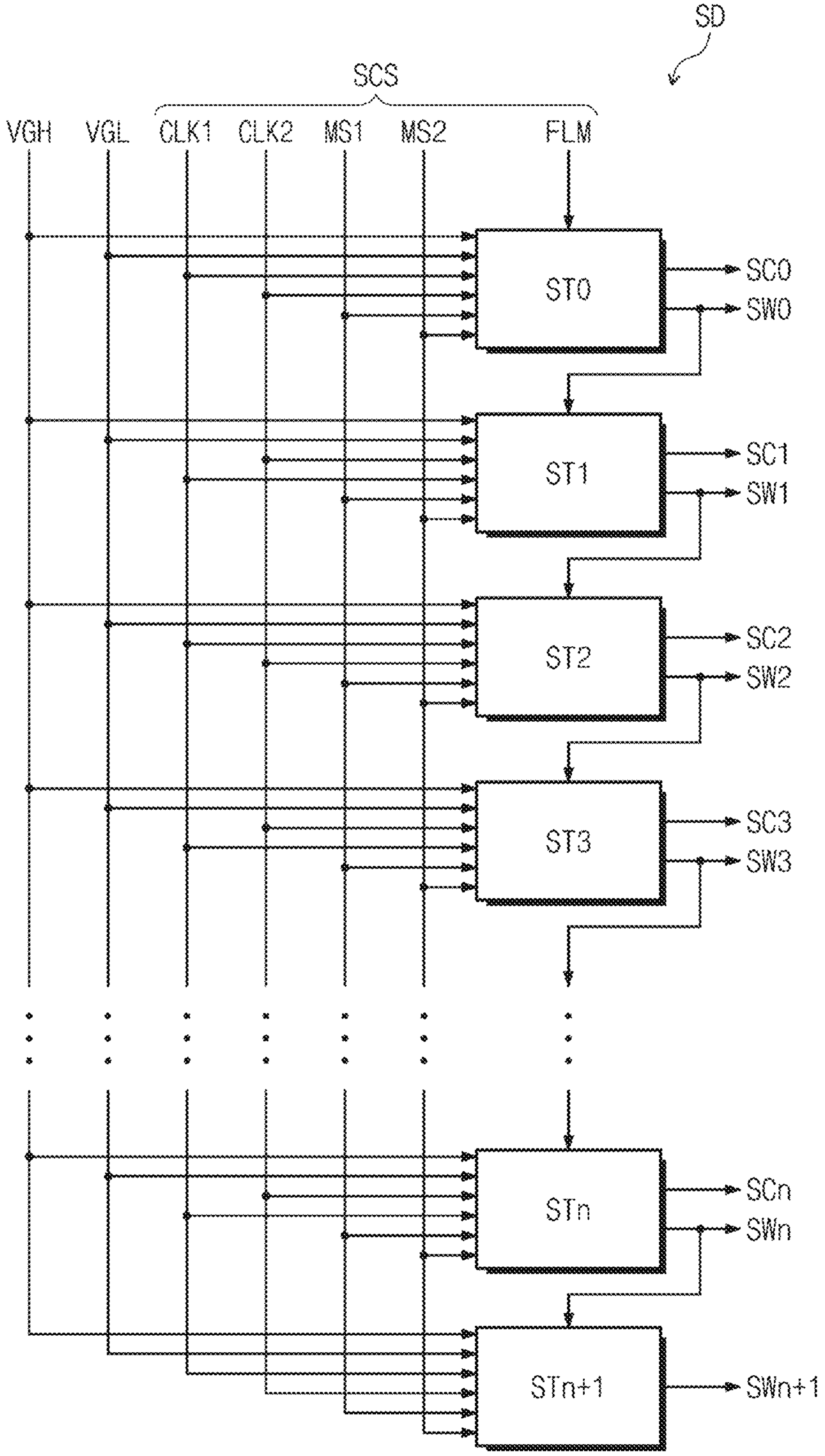
FIG. 7 is a block diagram illustrating a scan driving circuit according to an embodiment of the inventive concept.

FIG. 7 is a block diagram illustrating the scan driving circuit SD according to an embodiment of the inventive concept. FIG. 7 is a schematic view just illustrating the scan driving circuit SD, and the light-emitting driving circuit generating the emission control signals is omitted in FIG. 7.

Referring to FIG. 7, the scan driving circuit SD may include driving stages ST0-STn+1.

Each of the driving stages ST0-STn+1 may receive the scan control signal SCS from the driving controller 100 of FIG. 2. The scan control signal SCS may include a start signal FLM, a first clock signal CLK1, a second clock signal CLK2, and a masking signal. The masking signal may include a first masking signal MS1 and a second masking signal MS2. Each of the driving stages ST0-STn+1 may receive a first voltage VGL and a second voltage VGH. Even though now shown in FIG. 7, the first voltage VGL and the second voltage VGH may be provided from the voltage generator 300.

The first and second masking signals MS1 and MS2 may be used for masking the first and second scan signals, which are output from some of the driving stages ST0-STn+1 (i.e., corresponding to the second display region DA2 of FIG. 1A), to a specific level during the multi-frequency mode MFM.

In an embodiment, the driving stages ST0-STn+1 may output first scan signals SC0-SCn and second scan signals SW0-SWn+1. The first scan signals SC0-SCn may be provided to the first scan lines SL0-SLn of FIG. 4, and the second scan signals SW2-SWn+1 may be provided to the second scan lines SWL2-SWLn+1 of FIG. 4.

The display panel DP of FIG. 4 may include only the second scan lines SWL2-SWLn+1 but may not include the second scan lines SWL0 and SWL1. Thus, the second scan signals SW0 and SW1, which are output from the driving stages ST0 and ST1, may be only provided to next driving stages ST1 and ST2, but not to the display panel DP.

The driving stage ST0 may receive the start signal FLM as a carry signal. Each of the driving stages ST1-STn+1 has a dependent connection relation in which a second scan signal output from a previous driving stage is received as a carry signal. For example, the driving stage ST1 may receive the second scan signal SW0, which is output from the previous driving stage ST0, as the carry signal, and the driving stage ST2 may receive the second scan signal SW1, which is output from the previous driving stage ST1, as the carry signal. FIG. 7 illustrates an example, in which the j-th second scan signal SWj output from a j-th driving stage STj is provided as a carry signal for the (j+1)-th driving stage STj+1, but the inventive concept is not limited to this example. In another embodiment, the j-th second scan signal SWj, which is output from the j-th driving stage STj, may be provided as the carry signal of the (j+k)-th driving stage STj+k, where j and k are natural numbers.

Figure 8:
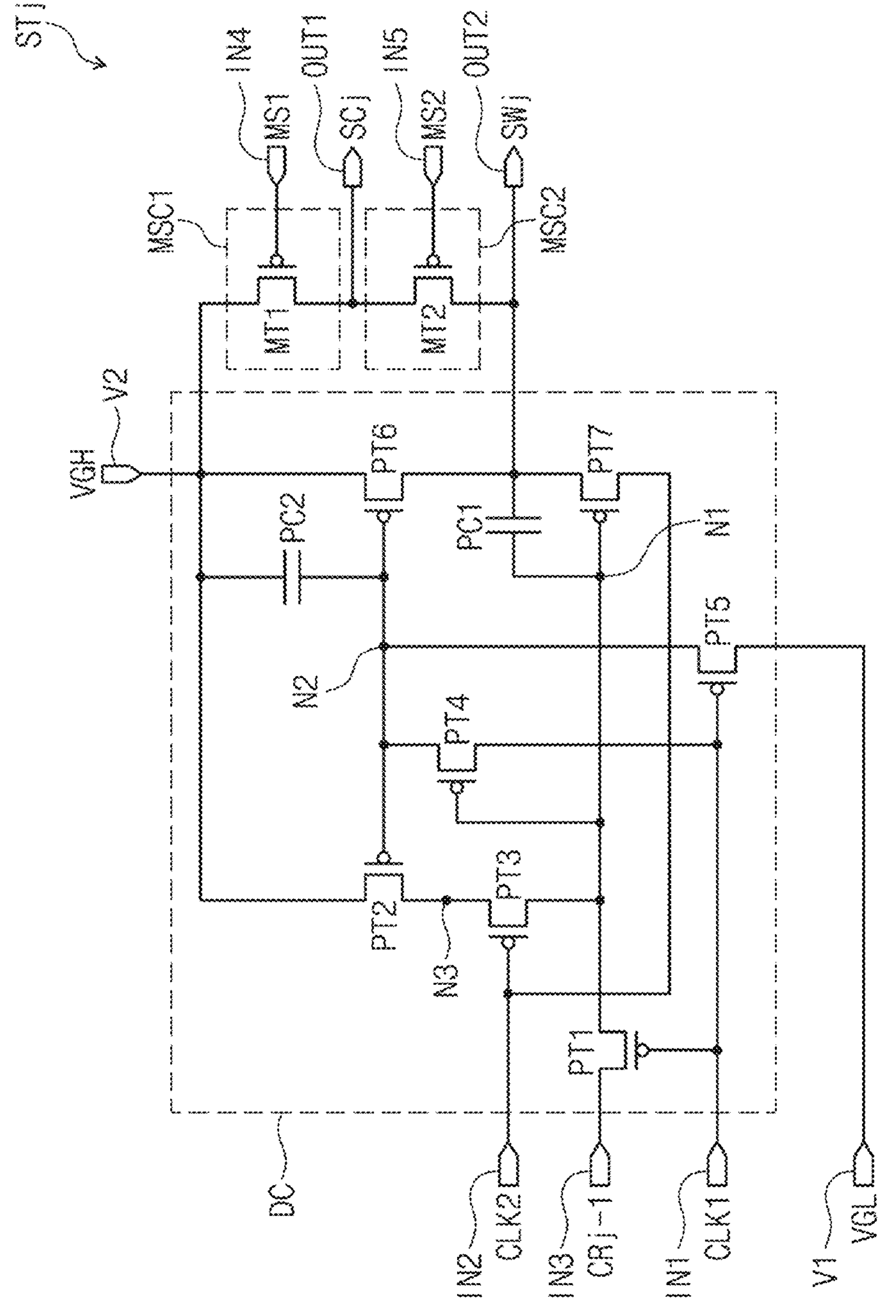
FIG. 8 illustrates one (e.g., j-th driving stage) of the driving stages of FIG. 7.

FIG. 8 exemplarily illustrates one (e.g., a j-th driving stage STj) of the driving stages ST0-STn+1 of FIG. 7, where j is a positive integer. Each of the driving stages ST0-STn+1 of FIG. 7 may be configured to have the same circuit structure as the j-th driving stage STj. Hereinafter, the j-th driving stage STj may be referred to as a driving stage STj.

Referring to FIG. 8, the driving stage STj may include a driving circuit DC, a masking circuit, first to fifth input terminals IN1-IN5, first and second voltage terminals V1 and V2, and first and second output terminals OUT1 and OUT2. The masking circuit may include a first masking circuit MSC1 and a second masking circuit MSC2.

The driving circuit DC may include transistors PT1-PT7 and capacitors PC1 and PC2.

The driving circuit DC may receive the first clock signal CLK1, the second clock signal CLK2, and a (j−1)-th carry signal CRj−1 through the first to third input terminals IN1-IN3, respectively. The driving circuit DC may receive the first voltage VGL and the second voltage VGH through the first voltage terminal V1 and the second voltage terminal V2, respectively. The driving circuit DC may output the j-th first scan signal SCj and the j-th second scan signal SWj through the first and second output terminals OUT1 and OUT2, respectively. The j-th second scan signal SWj may be provided to a next driving stage STj+1 as a j-th carry signal CRj. The (j−1)-th carry signal CRj−1 received through the third input terminal IN3 may be a (j−1)-th second scan signal SWj−1, which is output from a previous driving stage STj−1 shown in FIG. 7. The carry signal of the driving stage ST0 of FIG. 7 may be the start signal FLM.

For some (e.g., odd driving stages) of the driving stages ST0-STn+1 shown in FIG. 7, the first input terminal IN1 of each of them may receive the first clock signal CLK1, and the second input terminals IN2 of each of them may receive the second clock signal CLK2. In addition, for some (e.g., even driving stages) of the driving stages ST0-STn+1, the first input terminal IN1 of each of them may receive the second clock signal CLK2, and the second input terminals IN2 of each of them may receive the first clock signal CLK1.

The transistor PT1 may be connected between the third input terminal IN3 and a first node N1 and may include a gate electrode connected to the first input terminal IN1. The transistor PT2 may be connected between the second voltage terminal V2 and a third node N3 and may include a gate electrode connected to a second node N2. The transistor PT3 may be connected between the third node N3 and the first node N1 and may include a gate electrode connected to the second input terminal IN2.

The transistor PT4 may be connected between the second node N2 and the first input terminal IN1 and may include a gate electrode connected to the first node N1. The transistor PT5 may be connected between the second node N2 and the first voltage terminal V1 and may include a gate electrode connected to the first input terminal IN1. The transistor PT6 may be connected between the second voltage terminal V2 and the second output terminal OUT2 and may include a gate electrode connected to the second node N2. The transistor PT7 may be connected between the second output terminal OUT2 and the second input terminal IN2 and may include a gate electrode connected to the first node Ni.

The capacitor PC1 may be connected between the first node N1 and the second output terminal OUT2. The capacitor PC2 may be connected between the second voltage terminal V2 and the second node N2.

The first masking circuit MSC1 may include a first masking transistor MT1. The first masking circuit MSC1 may stops the outputting of the j-th first scan signal SCj, in response to the first masking signal MS1 received through the fourth input terminal IN4. The first masking transistor MT1 may be connected between the second voltage terminal V2 and the first output terminal OUT1 and may include a gate electrode connected to the fourth input terminal IN4.

The second masking circuit MSC2 may include a second masking transistor MT2. The second masking transistor MT2 may be connected between the first output terminal OUT1 and the second output terminal OUT2 and may include a gate electrode connected to the fifth input terminal IN5.

Figure 9:
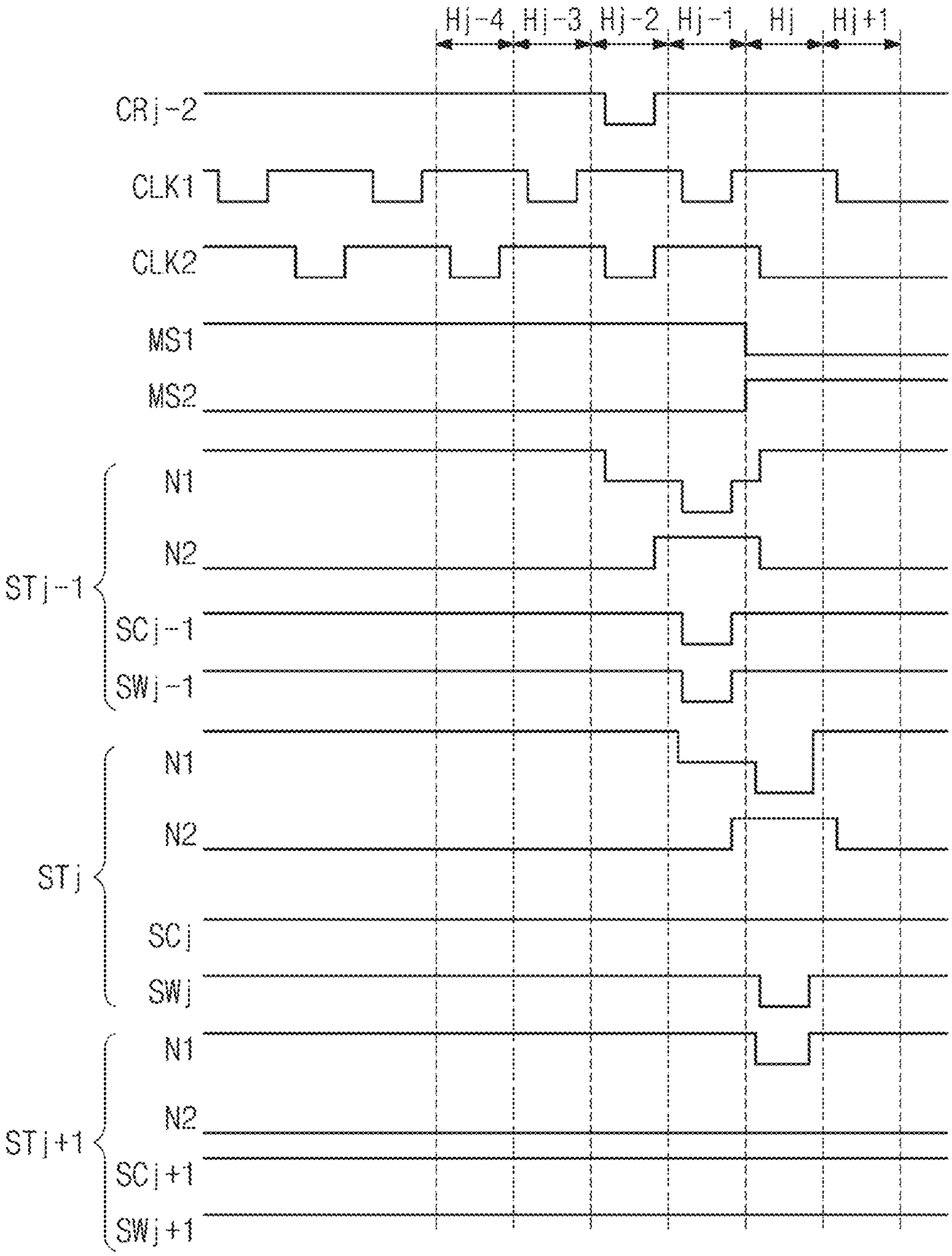
FIG. 9 is a timing diagram exemplarily illustrating operations of (j−1)-th, j-th, and (j+1)-th driving stages in the scan driving circuit of FIG. 7.

FIG. 9 is a timing diagram exemplarily illustrating operations of the (j−1)-th, j-th, and (j+1)-th driving stages STj−1, STj, and STj+1 in the scan driving circuit SD of FIG. 7.

Referring to FIGS. 7, 8, and 9, the first clock signal CLK1 and the second clock signal CLK2 may be signals, which have different frequencies from each other and are changed to an active level (e.g., a low level) in different horizontal periods H. The horizontal period H may be a time interval, in which the pixels PX, in the same row in the first direction DR1, of the display panel DP (e.g., see FIG. 4) are driven. Horizontal period Hj−4, Hj−3, Hj−2, Hj−1, Hj, Hj+1 are examples of the horizontal periods H.

If the first masking signal MS1 is a second level (e.g., a high level), the first masking transistor MT1 may be turned off, and thus, the second voltage terminal V2 and the first output terminal OUT1 may be maintained to an electrically-disconnected state from each other. If the second masking signal MS2 is a first level (e.g., a low level), the second masking transistor MT2 may be turned on, and thus, the first output terminal OUT1 and the second output terminal OUT2 may be maintained to an electrically-connected state from each other.

The (j−1)-th driving stage STj−1 may operate as follows:

The (j−1)-th driving stage STj−1 may receive the second clock signal CLK2 through the first input terminal IN1 and may receive the first clock signal CLK1 through the second input terminal IN2.

In the (j−2)-th horizontal period Hj−2, if the second clock signal CLK2 received through the first input terminal IN1 is the low level, the transistor PT1 in the driving circuit DC may be turned on. In this case, a (j−2)-th carry signal CRj−2 of the low level may be transmitted to the first node N1 through the transistor PT1. If second clock signal CLK2 is in the low level, the transistor PT5 may be turned on, and thus, the second node N2 may be discharged with the first voltage VGL. If the second node N2 is in the low level, the transistor PT6 may be turned on, and the second output terminal OUT2 may output the (j−1)-th second scan signal SWj−1 of the high level. In addition, if the first node Ni is in the low level, the transistor PT7 may be turned on, the second output terminal OUT2 may be maintained to the high level by the first clock signal CLK1 received through the second input terminal IN2.

In a (j−1)-th horizontal period Hj−1, if the second clock signal CLK2 is the high level, the transistor PT5 may be turn off, and the second node N2 may be changed to the high level by the transistor PT4 in a turn-on state, thereby turning off the transistor PT6. If the first clock signal CLK1 received through the second input terminal IN2 is the low level, the first node N1 may be changed to the low level by the capacitor PC1, thereby turning on the transistor PT7, and in this case, the second output terminal OUT2 may output the (j−1)-th second scan signal SWj−1 of the low level. Since, due to the second masking signal MS2 of the low level, the second masking transistor MT2 is in a turn-on state, the (j−1)-th first scan signal SCj−1 may be activated to the low level. That is, in the (j−1)-th horizontal period Hj−1, the (j−1)-th driving stage STj−1 may output the (j−1)-th first scan signal SCj−1 of the low level and the (j−1)-th second scan signal SWj−1 of the low level.

In the j-th horizontal period Hj, if the first masking signal MS1 is changed from the high level to the low level and the second masking signal MS2 is changed from the low level to the high level, the first masking transistor MT1 in the first masking circuit MSC1 may be turned on, and the second masking transistor MT2 in the second masking circuit MSC2 may be turned off.

The j-th driving stage STj may operate as follows:

The j-th driving stage STj may receive the first clock signal CLK1 through the first input terminal IN1 and may receive the second clock signal CLK2 through the second input terminal IN2.

In the (j−1)-th horizontal period Hj−1, if the first clock signal CLK1 is the low level, the transistor PT1 may be turned on. In this case, the (j−1)-th carry signal CRj−1 of the low level (i.e., the (j−1)-th second scan signal SWj−1) may be transmitted to the first node N1 through the transistor PT1. If the first clock signal CLK1 is in the low level, the transistor PT5 may be turned on, and thus, the second node N2 may be discharged with the first voltage VGL. If the second node N2 is in the low level, the transistor PT6 may be turned on, and in this case, the second output terminal OUT2 may output the j-th second scan signal SWj of the high level. In addition, if the first node N1 is in the low level, the transistor PT7 may be turned on, and in this case, the second output terminal OUT2 may be maintained to the high level by the second clock signal CLK2 received through the second input terminal IN2.

In the j-th horizontal period Hj, if the first clock signal CLK1 is the high level, the transistor PT5 may be turned off, and the second node N2 may be changed to the high level by the transistor PT4 in a turn-on state, thereby turning off the transistor PT6. If the second clock signal CLK2 received through the second input terminal IN2 is the low level, the first node N1 may be changed to the low level by the capacitor PC1, thereby turning on the transistor PT7, and in this case, the second output terminal OUT2 may output the j-th second scan signal SWj of the low level. Here, since the second masking transistor MT2 is in the turn-off state due to the second masking signal MS2 of the high level and the first masking transistor MT1 is in the turn-on state due to the first masking signal MS1 of the low level, the first scan signal SCj may be maintained to the high level. That is, in the j-th horizontal period Hj, the j-th driving stage STj may output the j-th first scan signal SCj of the high level and the j-th second scan signal SWj of the low level.

The (j+1)-th driving stage STj+1 may operate as follows:

The (j+1)-th driving stage STj+1 may receive the second clock signal CLK2 through the first input terminal IN1 and may receive the first clock signal CLK1 through the second input terminal IN2.

In the j-th horizontal period Hj, if the second clock signal CLK2 received through the first input terminal IN1 is the low level, the transistor PT1 in the driving circuit DC may be turned on. In this case, the j-th carry signal CRj of the low level may be transmitted to the first node N1 through the transistor PT1. If the first node N1 is in the high level, the transistors PT3, PT4, and PT7 may be maintained to the turn-off state.

In the (j+1)-th horizontal period Hj+1, if the second clock signal CLK2 is the low level, the transistor PT5 may be turned on. The second node N2 may be maintained to the low level by the transistor PT5 in a turn-on state, and the transistor PT6 may be turned on. Thus, the (j+1)-th second scan signal SWj+1 of the high level may be output. Since, due to the first masking signal MS1 of the low level, the first masking transistor MT1 is in the turn-on state, the (j+1)-th first scan signal SCj+1 may be maintained to the high level. In other words, the (j+1)-th driving stage STj+1 may output the (j+1)-th first scan signal SCj+1 of the high level and the (j+1)-th second scan signal SWj+1 of the high level.

The first display region DA1 of FIG. 1A is assumed to include the pixels of 0-th to (j−1)-th rows, and the second display region DA2 is assumed to include the pixels of j-th to n-th rows. In this case, in the j-th horizontal period Hj, by changing the first masking signal MS1 from the high level to the low level and changing the second masking signal MS2 from the low level to the high level, the j-th first scan signal SCj may be masked to the high level. Thereafter, by maintaining the first and second clock signals CLK1 and CLK2 to the low level, the (j+1)-th second scan signal SWj+1 may be masked to the high level.

Referring to FIGS. 5 and 9, the pixel PXij of the j-th row may be connected to the (j−1)-th first scan line SLj−1, the j-th first scan line SLj, and the (j+1)-th second scan line SWLj+1. The j-th second scan signal SWj should be normally output, when the j-th first scan signal SCj, which is provided to the pixel PXij of the j-th row corresponding to the second display region DA2, is masked to the high level, so as to normally display an image on a pixel PXij−1 of the (j−1)-th row corresponding to the first display region DA1.

Figure 10:
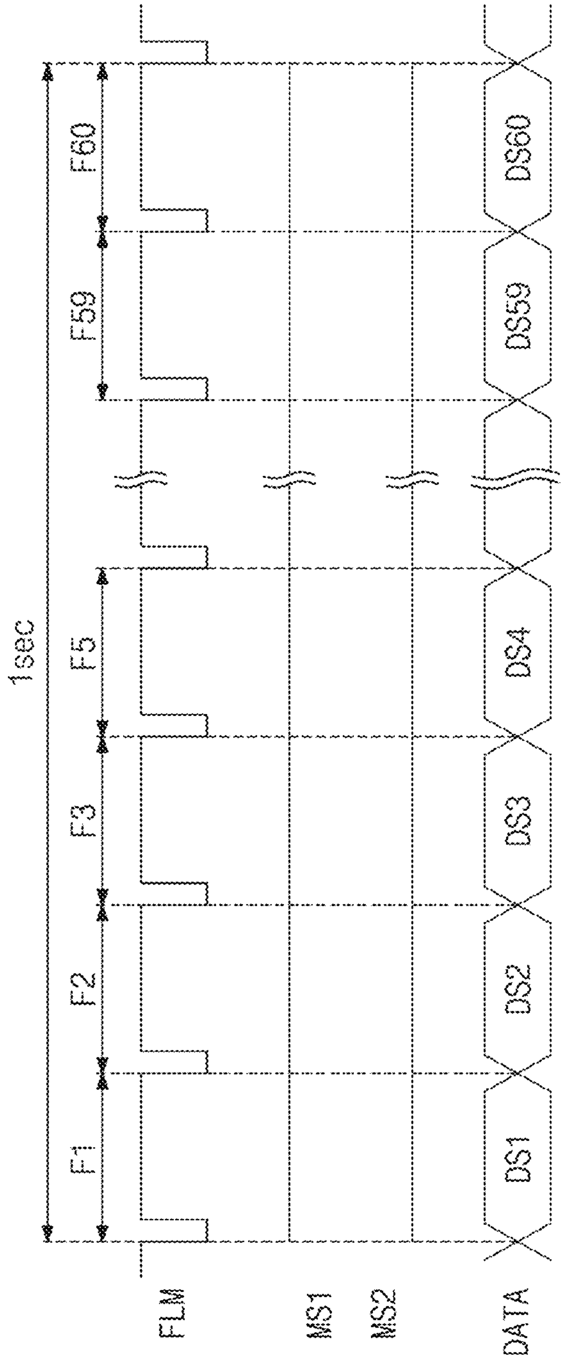
FIG. 10 is a diagram exemplarily illustrating signals and image data signals, which are provided from the driving controller of FIG. 4 to the scan driving circuit of FIG. 7 and the data driving circuit of FIG. 4 in a normal frequency mode.

FIG. 10 is a diagram exemplarily illustrating signals, which are provided from the driving controller 100 of FIG. 4 to the scan driving circuit SD, and the image data signal DATA, which is provided from the driving controller 100 to the data driving circuit 200, in the normal frequency mode.

Referring to FIGS. 4, 7, and 10, in the normal frequency mode NFM, the start signal FLM may be activated to the low level 60 times for 1 sec (assuming that normal frequency is 60 Hz). That is, the start signal FLM may be activated to the low level every frame (e.g., at each of the 1-st to 60-th frames F1 to F60). During the normal frequency mode NFM, the first masking signal MS1 may be maintained to the high level, and the second masking signal MS2 may be maintained to the low level. In the normal frequency mode NFM, a duration of a single frame may be a first time (e.g., 16.67 milliseconds (ms)).

The driving controller 100 may sequentially provide the image data signal DATA including data signals DS1 to DS60 to the data driving circuit 200. Here, the data signals DS1 to DS60 may correspond to the image data signal DATA at the 1-st to 60-th frames F1 to F60, respectively.

Figure 11A:
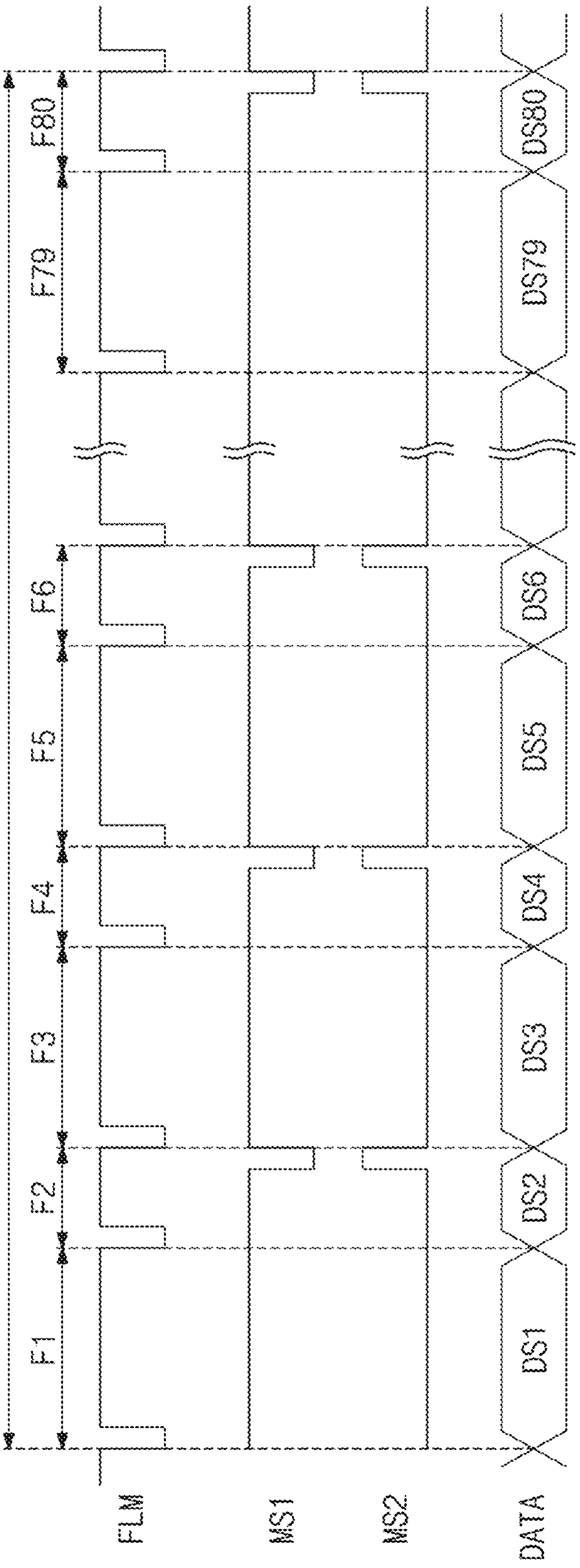
FIGS. 11A to 11C are diagrams exemplarily illustrating signals and image data signals DATA, which are provided from the driving controller of FIG. 4 to the scan driving circuit of FIG. 7 and the data driving circuit of FIG. 4 in a multi-frequency mode.
Figure 11B:
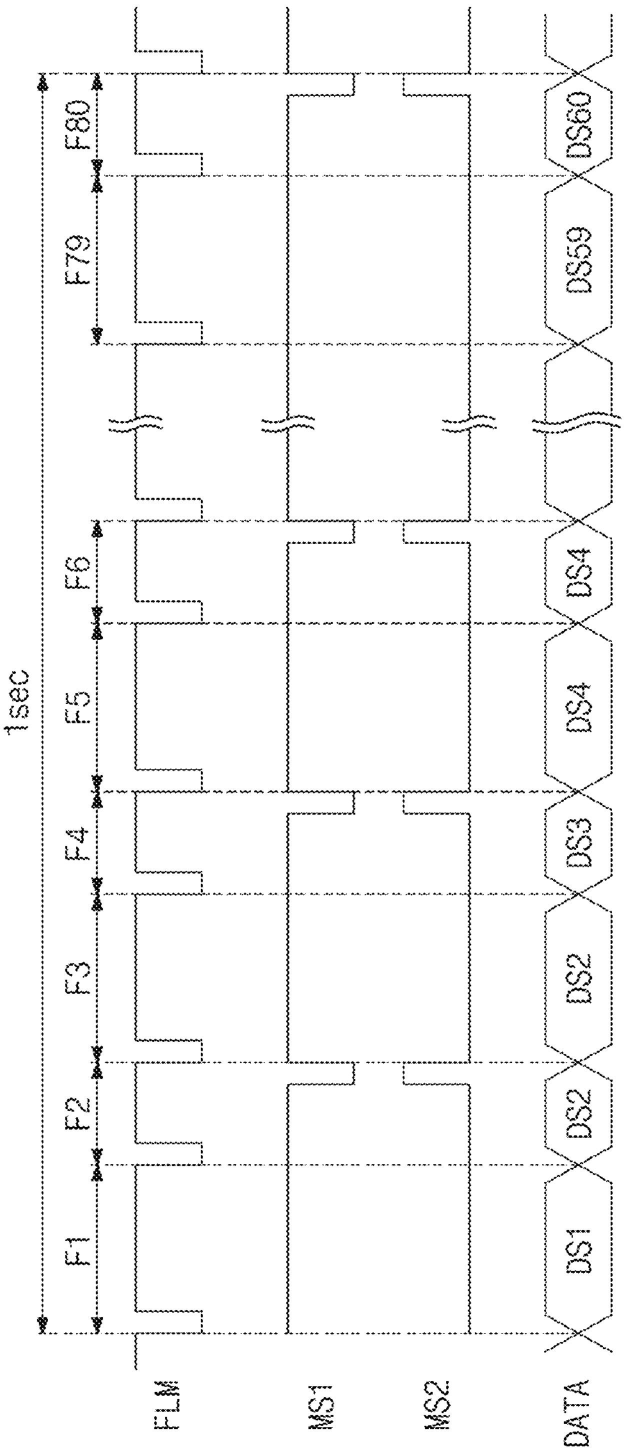
Figure 11C:
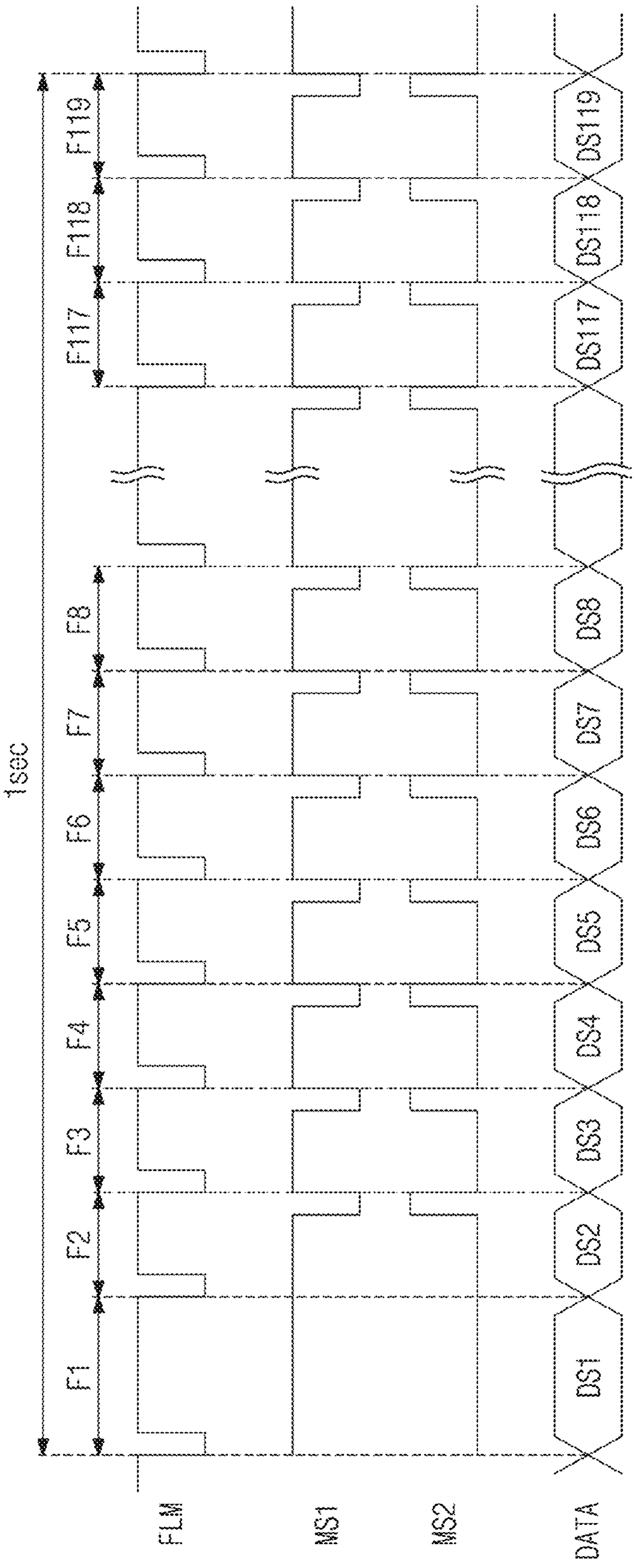

FIGS. 11A to 11C are a diagram exemplarily illustrating signals, which are provided from the driving controller 100 of FIG. 4 to the scan driving circuit SD, and the image data signal DATA, which is provided from the driving controller 100 to the data driving circuit 200, in the multi-frequency mode.

FIG. 11A is a timing diagram exemplarily illustrating signals and the image data signal DATA, which are provided to the scan driving circuit SD and the data driving circuit 200 of FIG. 4, when the first driving frequency of the first display region DA1 (e.g., see FIG. 3) is 80 Hz and the second driving frequency of the second display region DA2 (e.g., see FIG. 3) is 40 Hz in the multi-frequency mode MFM.

Referring to FIGS. 4, 7, and 11A, in the multi-frequency mode MFM, the start signal FLM may be activated to the low level 80 times for 1 sec. That is, the start signal FLM may be activated to the low level every frame (e.g., at each of the 1-st to 80-th frames F1 to F80).

When the first driving frequency of the first display region DA1 (e.g., see FIG. 1A) is 80 Hz and the second driving frequency of the second display region DA2 (e.g., see FIG. 1A) is 40 Hz, the duration of each of the odd frames F1, F3, F5, . . . , F79 may be different from the duration of each of the even frames F2, F4, F6, . . . , F80. For example, the duration of each of the odd frames F1, F3, F5, . . . , F79 may be 16.67 ms, and the duration of each of the even frames F2, F4, F6, . . . , F80 may be 8.34 ms. In other words, the duration of the first frame in the multi-frequency mode MFM may be the first time (e.g., 16.67 ms) which is the same as that in the normal frequency mode NFM, and the duration of the second frame following the first frame may be a second time shorter than the first time.

If, as described with reference to FIG. 3, the first and second driving frequencies are 80 Hz and 40 Hz, respectively, in the multi-frequency mode MFM, the first image IM1 may be displayed on the first display region DA1 of the display device DD at the 1-st to 80-th frames F1 to F80 for 1 sec, and the second image IM2 may be displayed on the second display region DA2 at odd frames F1, F3, . . . , F79 of the 80 frames. In other words, the second image IM2 may not be displayed at the even frames F2, F4, . . . , F80.

Assuming that a k-th driving stage STk of the driving stages ST0-STn+1 in the scan driving circuit SD corresponds to a starting position of the second display region DA2, the first masking signal MS1 may be changed to the low level and the second masking signal MS2 may be changed to the high level so as to mask (i.e., block) first scan signals SCk-SCn and second scan signals SWk+1-SWn+1, which are output from the driving stages STk-STn+1 at the even frames F2, F4, . . . , F80 of the multi-frequency mode MFM. The driving stages STk-STn+1 may not activate the first scan signals SCk-SCn and the second scan signals SWk+1-SWn+1 to the low level, in response to the first masking signal MS1 of the low level and the second masking signal MS2 of the high level. When the even frame (e.g., F2) is finished and the next odd frame (e.g., F3) is started, the first and second masking signals MS1 and MS2 may be changed to the high and low levels, respectively, to prepare a new frame.

FIG. 11B is a timing diagram exemplarily illustrating signals and the image data signal DATA, which are provided to the scan driving circuit SD and the data driving circuit 200 from the driving controller 100 of FIG. 4, when the first driving frequency of the first display region DA1 (e.g., see FIG. 1A) is 80 Hz and the second driving frequency of the second display region DA2 (e.g., see FIG. 1A) is 40 Hz in the multi-frequency mode MFM.

Referring to FIGS. 4, 7, and 11B, even in the multi-frequency mode MFM, the frequency of the image signal RGB provided from the outside to the driving controller 100 may be 60 Hz. In other words, the image signal RGB of 60 frames per 1 sec may be provided to the driving controller 100. When the driving frequency of the first display region DA1 is changed to the first driving frequency of 80 Hz that is higher than the normal frequency of 60 Hz, the driving controller 100 should further generate the image data signal DATA of 20 frames every 1 second. In this case, the driving controller 100 may output the image data signal for a previous frame as an image data signal for the current frame.

In an embodiment, for example, the driving controller 100 may output the data signal DS1 as the image data signal DATA at the 1-st frame F1 and may repeatedly output the data signal DS2 as the image data signal DATA at the second and third frames F2 and F3. Since the driving controller 100 outputs the same data signal DS2 twice as the image data signal DATA, it may be possible to improve a luminance property of an image displayed on the first display region DA1 of the display device DD. Since a refresh period of the first display region DA1, on which the video image (i.e., a moving image) is displayed, is reduced, the display quality may be improved.

FIG. 11C is a timing diagram exemplarily illustrating signals and the image data signal DATA, which are provided to the scan driving circuit SD and the data driving circuit 200 from the driving controller 100 of FIG. 4, when the first driving frequency of the first display region DA1 (e.g., see FIG. 1A) is 119 Hz and the second driving frequency of the second display region DA2 (e.g., see FIG. 1A) is 1 Hz in the multi-frequency mode MFM.

Referring to FIGS. 4, 7, and 11C, in the multi-frequency mode MFM, the start signal FLM may be activated to the low level 119 times for 1 sec. That is, the start signal FLM may be activated to the low level every frame (e.g., at each of 1-st to 119-th frames F1 to F119).

When the first driving frequency of the first display region DA1 (e.g., see FIG. 1A) is 119 Hz and the second driving frequency of the second display region DA2 (e.g., see FIG. 1A) is 1 Hz, the duration of the 1-st frame F1 may be different from the duration of each of the remaining frames F2-F119. For example, the duration of the 1-st frame F1 may be 16.67 ms, and the duration of each of the 2-nd to 119-th frames F2-F119 may be 8.34 ms.

Assuming that the k-th driving stage STk of the driving stages ST0-STn+1 in the scan driving circuit SD corresponds to a starting position of the second display region DA2, the first masking signal MS1 may be changed to the low level and the second masking signal MS2 may be changed to the high level so as to mask (i.e., block) the first scan signals SCk-SCn and the second scan signals SWk+1-SWn+1, which are output from the driving stages STk-STn+1 at the frames F2-F119 of the multi-frequency mode MFM. The driving stages STk-STn+1 may maintain the first scan signals SCk-SCn and the second scan signals SWk+1-SWn+1 to the high level, in response to the first masking signal MS1 of the low level and the second masking signal MS2 of the high level. When the second frame F2 is finished and the next third frame F3 is started, the first and second masking signals MS1 and MS2 may be changed to the high and low levels to prepare a new frame, respectively.

Figure 12:
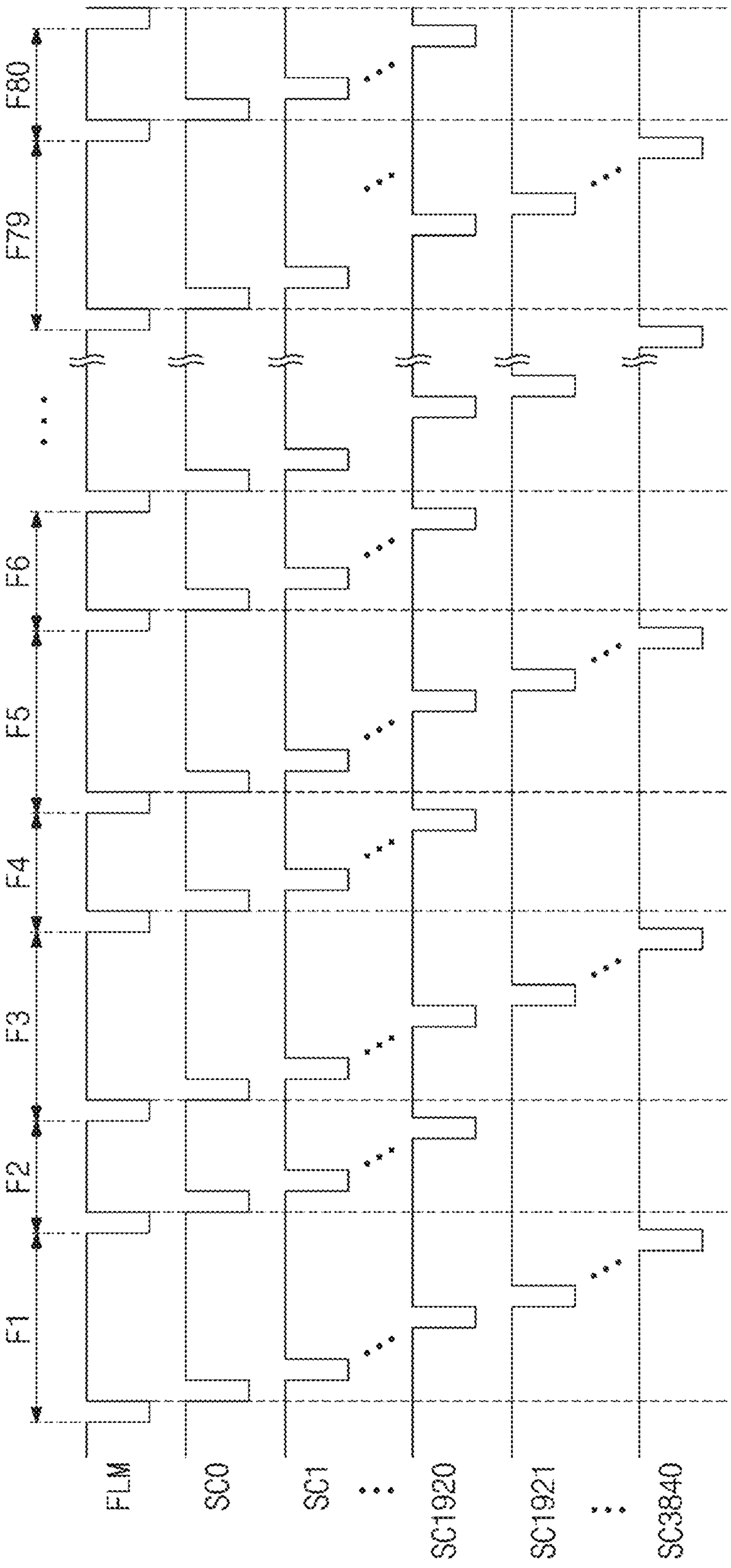
FIG. 12 is a diagram exemplarily illustrating first scan signals, which are output from a scan driving circuit, in a multi-frequency mode.

FIG. 12 is a diagram exemplarily illustrating first scan signals, which are output from the scan driving circuit SD, in the multi-frequency mode.

FIG. 12 exemplarily illustrates first scan signals SC0-SC3840, which are output from the scan driving circuit SD of FIG. 7, when the first driving frequency of the first display region DA1 (e.g., see FIG. 1A) is 80 Hz and the second driving frequency of the second display region DA2 (e.g., see FIG. 1A) is 40 Hz in the multi-frequency mode MFM.

The first display region DA1 of FIG. 1A is assumed to include the pixels of 0-th to 1920-th rows, and the second display region DA2 is assumed to include the pixels of 1921-th to 3840-th rows.

Referring to FIGS. 4, 7, and 12, in the multi-frequency mode MFM, the start signal FLM may be activated to the low level 80 times for 1 sec. That is, the start signal FLM may be activated to the low level every frame (e.g., at each of the 1-st to 80-th frames F1 to F80).

When the first driving frequency of the first display region DA1 (e.g., see FIG. 1A) is 80 Hz and the second driving frequency of the second display region DA2 (e.g., see FIG. 1A) is 40 Hz, the duration of each of the odd frames F1, F3, F5, . . . , F79 may be 16.67 ms and the duration of each of the even frames F2, F4, F6, . . . , F80 may be 8.34 ms.

At the odd frames F1, F3, F5, . . . , F79 of the multi-frequency mode MFM, the driving stages ST0-STn in the scan driving circuit SD may sequentially output the first scan signals SC0-SCn.

Assuming that a 1921-th driving stage ST1921 of the driving stages ST0-ST3840 in the scan driving circuit SD corresponds to a starting position of the second display region DA2, the driving stages ST0-ST1920 may sequentially activate the first scan signals SC0-SC1920 to the low level, and the driving stages ST1921-ST3840 may maintain the first scan signals SC1921-SC3840 to the high level, at the even frames F2, F4, F6, . . . , F80 of the multi-frequency mode MFM.

Likewise, among the driving stages ST0-ST3840 in the scan driving circuit SD, the driving stages ST0-ST1920 corresponding to the first display region DA1 may be sequentially operated every frame to display the first image IM1 on the first display region DA1. Among the driving stages ST0-ST3840 in the scan driving circuit SD, the driving stages ST1921-ST3840 corresponding to the second display region DA2 may be sequentially operated only at some frames (e.g., the odd frames F1, F3, F5, . . . , F79) to display the second image IM2 on the second display region DA2. Since, among the driving stages ST0-ST3840 in the scan driving circuit SD, the driving stages ST1921-ST3840 corresponding to the second display region DA2 are not operated at some frames (e.g., even frames F2, F4, F6, . . . , F80), the power consumption may be reduced.

In addition, since the first display region DA1 is driven with a frequency (e.g., 80 Hz) higher than the normal frequency (e.g., 60 Hz), the first image IM1, which is a video image (i.e., a moving image), may be displayed with improved display quality.

Figure 13:
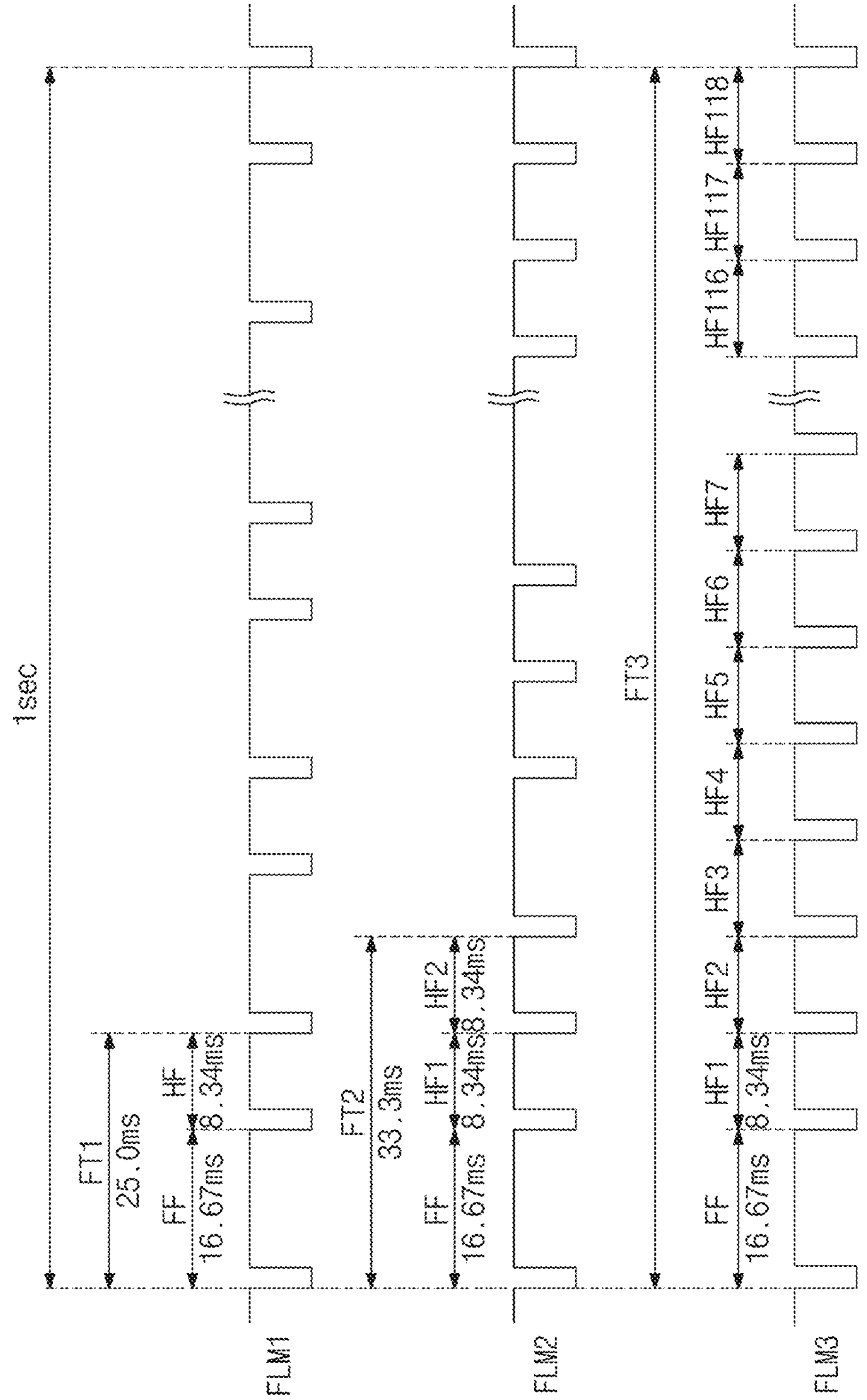
FIG. 13 is a diagram exemplarily illustrating start signals, which are provided from the driving controller of FIG. 4 to the scan driving circuit of FIG. 7, in a multi-frequency mode.

FIG. 13 is a diagram exemplarily illustrating start signals, which are provided from the driving controller 100 of FIG. 4 to the scan driving circuit SD of FIG. 7, in the multi-frequency mode MFM.

When the normal frequency is 60 Hz, a duration of a full frame FF is 16.67 ms, and a duration of a half frame HF is 8.34 ms. The full frame FF may be a frame, during which both of the first and second display regions DA1 and DA2 (e.g., see FIG. 1A) are driven, and the half frame HF may be a frame, during which only the first display region DA1 is driven.

A period FT1 of a start signal FLM1 may include one full frame FF and one half frame HF and may have a duration of 25.0 ms.

A first driving frequency DF1 of the first display region DA1 may be calculated by the following formula 1.

$$DF1=1000\ ms/((FFT+HFT)/(1+HFN)) \quad \text{[Formula 1]}$$

A second driving frequency DF2 of the second display region DA2 may be calculated by the following formula 2.

$$DF2=1000\ ms/(FFT+HFT) \quad \text{[Formula 2]}$$

In the Formulas 1 and 2, FFT, HFT, and HFN are the duration of the full frame FF, the duration of the half frame HF (i.e., duration of total half frames included), and the number of the half frames HF within the period FT1, respectively.

Since the normal frequency is 60 Hz, the duration FFT of the full frame FF within the period FT1 of the start signal FLM1 is 16.67 ms, the duration HFT of the half frame HF is 8.34 ms, and the number of the half frame HF is 1, the first driving frequency DF1 of the first display region DA1 is 80 Hz (i.e., 1000 ms/((16.67 ms+8.34 ms)/(1+1))), and the second driving frequency DF2 of the second display region DA2 is 40 Hz (i.e., 1000 ms/(16.67 ms+8.34 ms)).

A period FT2 of a start signal FLM2 may include one full frame FF and two half frames HF1 and HF2 and may have a duration of 33.3 ms.

Since the normal frequency is 60 Hz, the duration FFT of the full frame FF within the period FT2 of the start signal FLM2 is 16.67 ms, the duration HFT of the sum of the half frames HF1 and HF2 is 16.68 ms, and the number of the half frames HF1 and HF2 is 2, the first driving frequency DF1 of the first display region DA1 is 90 Hz (i.e., 1000 ms/((16.67 ms+16.68 ms)/(1+2))), and the second driving frequency DF2 of the second display region DA2 is 30 Hz (i.e., 1000 ms/(16.67 ms+16.68 ms)).

A period FT3 of a start signal FLM3 may include one full frame FF and 118 half frames HF1, HF2, HF118 and may have a duration of 1000 ms.

Since the normal frequency is 60 Hz, the duration FFT of the full frame FF within the period FT3 of the start signal FLM3 is 16.67 ms, the duration HFT of the sum of the half frames HF1, HF2, HF118 is 983.32 ms, and the number of the half frames HF1, HF2, HF118 is 118, the first driving frequency DF1 of the first display region DA1 is 119 Hz (i.e., 1000 ms/((16.67 ms+983.32 ms)/(1+118))), and the second driving frequency DF2 of the second display region DA2 is 1 Hz (i.e., 1000 ms/(16.67 ms+983.32 ms)).

The following table 2 shows how the first driving frequency DF1 of the first display region DA1 and the second driving frequency DF2 of the second display region DA2 change with the number of the half frames HF within the period of the start signal FLM, when the normal frequency is 60 Hz and a length ratio of the first display region DA1 to the second display region DA2 in the second direction DR2 is 1:1. The result in the table 2 is obtained under the assumption that, when the normal frequency is "60 Hz", the duration of the full frame FF is 16.66 ms and the duration of each half frame HF is 8.33 ms.

TABLE 2

| Number of half frame HF | First driving frequency DF1 | Second driving frequency DF2 |
|---|---|---|
| 1 | 80.03 Hz | 40.02 Hz |
| 2 | 90.04 Hz | 30.01 Hz |
| 3 | 96.04 Hz | 24.01 Hz |
| 10 | 110.04 Hz | 10 Hz |
| 20 | 114.59 Hz | 5.46 Hz |
| 118 | 119.05 Hz | 1 Hz |

The following table 3 shows how the first driving frequency DF1 of the first display region DA1 and the second driving frequency DF2 of the second display region DA2 change with the number of the half frames HF within the period of the start signal FLM, when the normal frequency is 120 Hz and the length ratio of the first display region DA1 to the second display region DA2 in the second direction DR2 is 1:1. The result in the table 3 is obtained under the assumption that, when the normal frequency is "120 Hz", the duration of the full frame FF is 8.34 ms and the duration of each half frame HF is 4.17 ms.

TABLE 3

| Number of half frame HF | First driving frequency DF1 | Second driving frequency DF2 |
|---|---|---|
| 1 | 159.87 Hz | 79.94 Hz |
| 2 | 179.86 Hz | 59.95 Hz |
| 3 | 191.85 Hz | 47.96 Hz |
| 10 | 219.82 Hz | 19.98 Hz |
| 20 | 228.91 Hz | 10.9 Hz |
| 100 | 237.46 Hz | 2.35 Hz |
| 239 | 238.81 Hz | 1.0 Hz |

The following table 4 shows how the first driving frequency DF1 of the first display region DA1 and the second driving frequency DF2 of the second display region DA2 change with the number of the half frames HF within the period of the start signal FLM, when the normal frequency is 144 Hz and the length ratio of the first display region DA1 to the second display region DA2 in the second direction DR2 is 1:1. The result in the table 4 is obtained under the assumption that, when the normal frequency is "144 Hz", the duration of the full frame FF is 6.94 ms and the duration of each half frame HF is 3.47 ms.

TABLE 4

| Number of half frame HF | First driving frequency DF1 | Second driving frequency DF2 |
|---|---|---|
| 1 | 192.12 Hz | 96.06 Hz |
| 2 | 216.14 Hz | 72.05 Hz |
| 3 | 230.55 Hz | 57.64 Hz |
| 10 | 264.17 Hz | 24.02 Hz |
| 20 | 275.09 Hz | 13.10 Hz |
| 100 | 285.36 Hz | 2.83 Hz |
| 287 | 287.19 Hz | 1.0 Hz |

Figure 14:
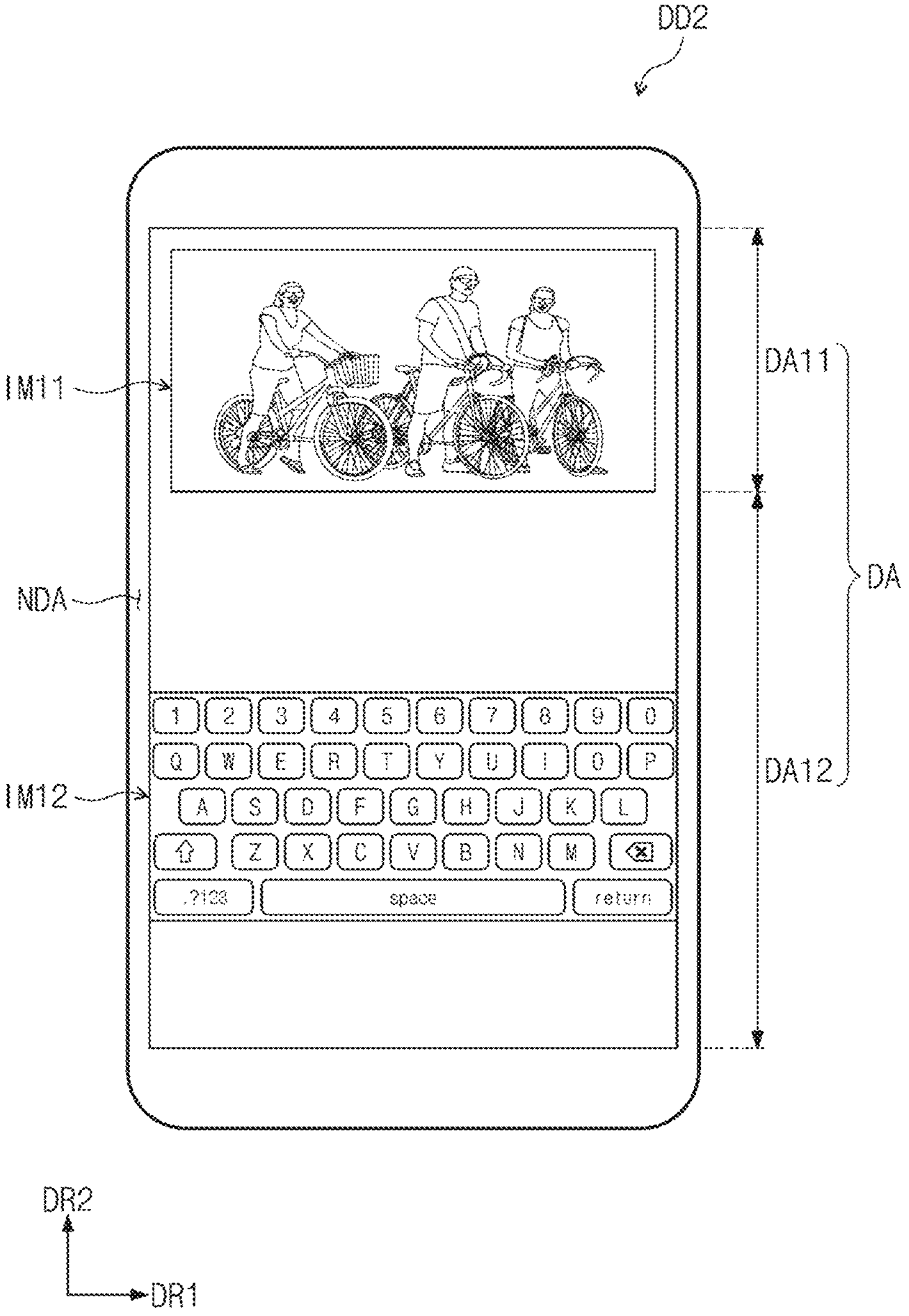
FIG. 14 is a top plan view illustrating a display device according to an embodiment of the inventive concept.

FIG. 14 is a top plan view illustrating a display device DD2 according to an embodiment of the inventive concept.

Referring to FIG. 14, a display surface of the display device DD2 may be parallel to a surface defined by the first and second directions DR1 and DR2. The display surface of the display device DD2 may include a plurality of distinct regions. The display surface may include the display region DA, on which the first image IM11 and the second image IM12 are displayed, and the non-display region NDA, which is adjacent to the display region DA. As an example, the display region DA may be rectangular or square. The non-display region NDA may enclose the display region DA. In addition, although not shown, the display device DD2 may include a partially curved shape. In this case, a region of the display region DA may have a curved or rounded shape.

The display region DA of the display device DD2 may include a first display region DA11 and a second display region DA12. In a specific application program, the first display region DA11 may be used to display a first image IM11, and the second display region DA12 may be used to display a second image IM12. In an embodiment, the first image IM11 may be a video image (i.e., a moving image), and the second image IM12 may be a still image or a text image which does not change for a relatively long period compared to the moving image.

As shown in FIG. 14, an area of the first display region DA11, on which the first image IM11 or the video image is displayed, may be smaller than an area of the second display region DA12, on which the second image IM12 or the still image is displayed. In this case, the first display region DA11 may be operated with an increased driving frequency and the second display region DA12 may be operated with a reduced driving frequency, when compared with the case in which the first and second display regions DA11 and DA12 have the same area.

The following table 5 shows how the first driving frequency DF1 of the first display region DA1 and the second driving frequency DF2 of the second display region DA2 change with the number of the half frames HF within the period of the start signal FLM, when the normal frequency is 60 Hz and the length ratio of the first display region DA1 to the second display region DA2 in the second direction DR2 is 1:2. The result in the table 5 is obtained under the assumption that, when the normal frequency is 60 Hz, the duration of the full frame FF is 16.66 ms and the duration of each half frame HF is 5.55 ms. In the case where the length ratio of the first display region DA1 to the second display region DA2 in the second direction DR2 is 1:2, the duration of each half frame HF may be ⅓ of the duration of the full frame FF.

TABLE 5

| Number of half frame HF | First driving frequency DF1 of first display region DA1 | Second driving frequency DF2 of second display region DA2 |
|---|---|---|
| 1 | 90.05 Hz | 45.02 Hz |
| 2 | 108.07 Hz | 36.02 Hz |
| 3 | 120.08 Hz | 30.02 Hz |
| 10 | 152.44 Hz | 13.86 Hz |
| 20 | 164.50 Hz | 7.83 Hz |
| 118 | 177.2 Hz | 1.49 Hz |

The following table 6 shows how the first driving frequency DF1 of the first display region DA1 and the second driving frequency DF2 of the second display region DA2 change with the number of the half frames HF within the period of the start signal FLM, when the normal frequency is 60 Hz and the length ratio of the first display region DA1 to the second display region DA2 in the second direction DR2 is 1:3. The result in the table 6 is obtained under the assumption that, when the normal frequency is 60 Hz, the duration of the full frame FF is 16.66 ms and the duration of each half frame HF is 4.17 ms. In the case where the length ratio of the first display region DA1 to the second display region DA2 in the second direction DR2 is 1:3, the duration of each half frame HF may be ¼ of the duration of the full frame FF.

TABLE 6

| Number of half frame HF | First driving frequency DF1 of first display region DA1 | Second driving frequency DF2 of second display region DA2 |
|---|---|---|
| 1 | 96.04 Hz | 48.02 Hz |
| 2 | 120.05 Hz | 40.02 Hz |
| 3 | 137.2 Hz | 34.3 Hz |
| 10 | 188.65 Hz | 17.15 Hz |
| 20 | 210.08 Hz | 10.0 Hz |
| 118 | 234.24 Hz | 1.97 Hz |

Figure 15:
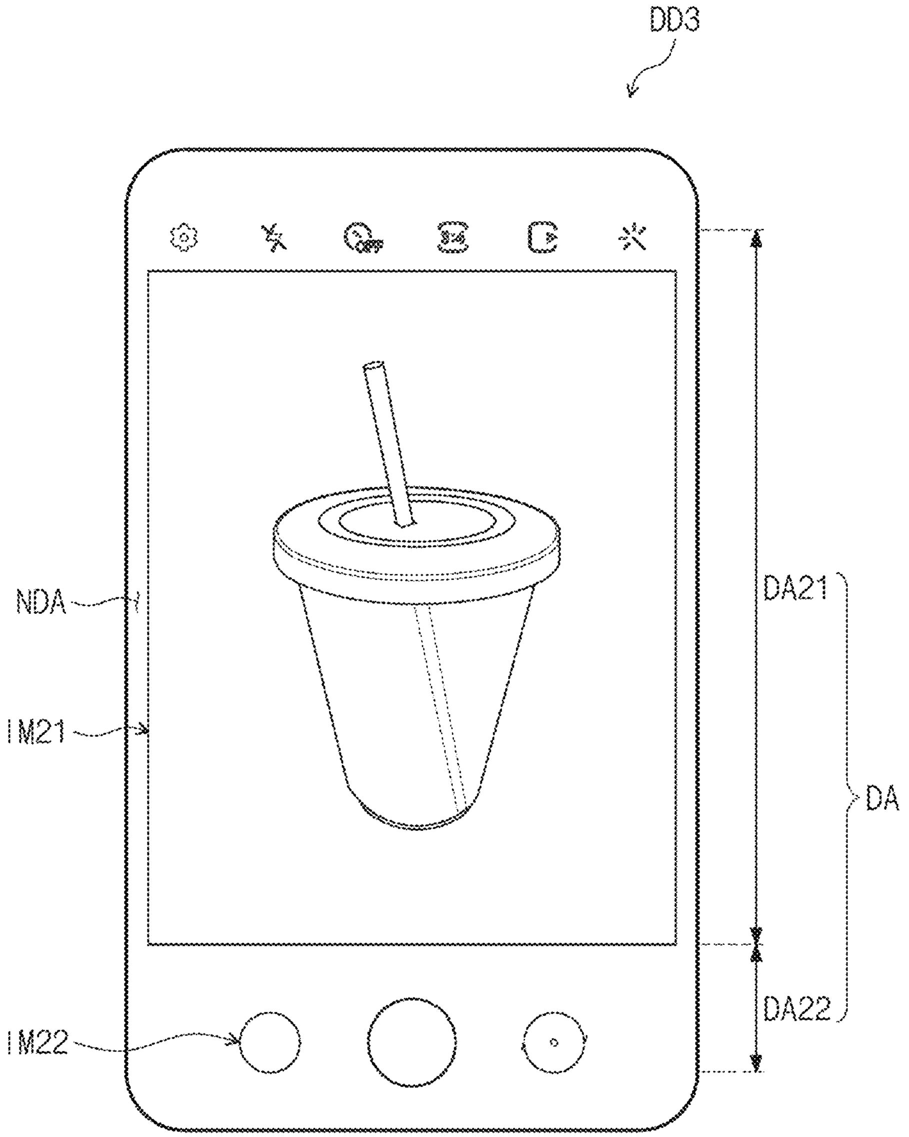
FIG. 15 is a top plan view illustrating a display device according to an embodiment of the inventive concept.

FIG. 15 is a top plan view illustrating a display device DD3 according to an embodiment of the inventive concept.

Referring to FIG. 15, a display surface of the display device DD3 may be parallel to a surface that is defined by the first and second directions DR1 and DR2. The display surface of the display device DD3 may include a plurality of distinct regions. The display surface may include the display region DA, on which the first image IM21 and the second image IM22 are displayed, and the non-display region NDA, which is adjacent to the display region DA.

The display region DA of the display device DD3 may include a first display region DA21 and a second display region DA22. In a specific application program, a first image IM21 may be displayed on the first display region DA21, and a second image IM22 may be displayed on the second display region DA22. For example, the first image IM21 may be a video image (i.e., a moving image), and the second image IM22 may be a still image or a text image which does not change for a relatively long period compared to the moving image.

As shown in FIG. 15, an area of the first display region DA21, on which the first image IM21 or the video image is displayed, may be larger than an area of the second display region DA22, on which the second image IM22 or the still image is displayed. In this case, the first display region DA21 may be operated with a reduced driving frequency and the second display region DA22 may be operated with an increased driving frequency, when compared with the case in which the first and second display regions DA21 and DA22 have the same area.

As shown in FIGS. 14 and 15, the driving frequency for the first display region DA11 or DA21 and the driving frequency for the second display region DA12 or DA22 may be determined in consideration of a ratio between an area displaying the video image (i.e., a moving image) and an area displaying the still image.

The scan driving circuit SD shown in FIG. 7 may sequentially output the first scan signals from SC0 to SCn and sequentially output the second scan signals from SW0 to SWn+1. In another embodiment, if the scan driving circuit SD can sequentially output the first scan signals from SCn to SC1 and can sequentially output the second scan signals from SWn+1 to SW0, the display device DD of FIG. 1A, the display device DD2 of FIG. 14, and the display device DD3 of FIG. 15 may be operated in a multi-frequency mode, when a video image (i.e., a moving image) is displayed on the second display regions DA2, DA12, and DA22. In this case, the first display regions DA1, DA11, and DA21 may be driven with a second driving frequency lower than the normal frequency, whereas the second display regions DA2, DA12, and DA22 may be driven with a first driving frequency higher than the normal frequency.

According to an embodiment of the inventive concept, a display device may include a first display region, which is used to display a video image (i.e., a moving image), and a second display region, which is used to display a still image and is operated with a driving frequency different from that for the first display region. For example, the first display region displaying the video image may be operated with the driving frequency that is higher than a normal frequency, and in this case, it may be possible to improve the display quality of the display device. In addition, the second display region displaying the still image may be operated with the driving frequency that is lower than the normal frequency, and in this case, it may be possible to reduce power consumption of the display device.

While example embodiments of the inventive concept have been particularly shown and described, it will be understood by one of ordinary skill in the art that variations in form and detail may be made therein without departing from the spirit and scope of the attached claims.

What is claimed is:

1. A driving controller, comprising:

a controller which receives an image signal and output an image data signal, wherein the controller outputs the image data signal which corresponds to a first display region and a second display region of a display during a first frame, wherein the controller outputs the image data signal which corresponds to the first display region during a second frame, wherein the controller outputs a start signal indicating a start of each of the first frame and the second frame following the first frame and a masking signal indicating a start of the second display region following the first display region, and wherein the first frame has a first duration, and the second frame has a second duration.

2. The driving controller of claim 1, wherein the second duration of the second frame is different from the first duration of the first frame during a first mode.

3. The driving controller of claim 1, wherein the second duration of the second frame is shorter than the first duration of the first frame during a first mode.

4. The driving controller of claim 3, wherein the first duration of the first frame is equal to the second duration of the second frame, during a second mode different from the first mode.

5. The driving controller of claim 4, wherein the first duration of the first frame during the first mode is equal to the first duration of the first frame during the second mode.

6. The driving controller of claim 5, wherein the controller drives the first display region and the second display region with a predetermined frequency, during the second mode.

7. The driving controller of claim 6, wherein the controller drives the first display region with a first driving frequency higher than or equal to the predetermined frequency and drives the second display region with a second driving frequency lower than the predetermined frequency, during the first mode.

8. A display device, comprising:

a display panel including a first display region and a second display region; and a controller which receives an image signal and output an image data signal to the display panel, wherein the controller outputs the image data signal which corresponds to the first display region and the second display region during a first frame, wherein the controller outputs the image data signal which corresponds to the first display region during a second frame, wherein the controller outputs a start signal indicating a start of each of the first frame and the second frame following the first frame and a masking signal indicating a start of the second display region following the first display region, and wherein the first frame has a first duration, and the second frame has a second duration.

9. The display device of claim 8, wherein the second duration of the second frame is different from the first duration of the first frame during a first mode.

10. The display device of claim 8, wherein the second duration of the second frame is shorter than the first duration of the first frame during a first mode.

11. The display device of claim 10, wherein the first duration of the first frame is equal to the second duration of the second frame, during a second mode different from the first mode.

12. The display device of claim 11, wherein the first duration of the first frame during the first mode is equal to the first duration of the first frame during the second mode.

13. The display device of claim 12, wherein the controller drives the first display region and the second display region with a predetermined frequency, during the second mode.

14. The display device of claim 13, wherein the controller drives the first display region with a first driving frequency higher than or equal to the predetermined frequency and drives the second display region with a second driving frequency lower than the predetermined frequency, during the first mode.

15. The display device of claim 8, wherein the display panel comprises a plurality of pixels which are connected to a plurality of data lines and a plurality of scan lines.

16. The display device of claim 15, further comprising:

a data driving circuit which drives the plurality of data lines; and a scan driving circuit which drives the plurality of scan lines, wherein the scan driving circuit sequentially drives the plurality of scan lines in synchronization with the start signal, and stops a driving of the scan lines, corresponding to the second display region of the plurality of scan lines in response to the masking signal.

* * * * *